US008272062B2

(12) United States Patent
Miki et al.

(10) Patent No.: US 8,272,062 B2
(45) Date of Patent: Sep. 18, 2012

(54) CONTENT CONTROL SYSTEM

(75) Inventors: Kazuho Miki, Musashino (JP); Daisuke Matsubara, Tachikawa (JP); Hiroshi Kurihara, Kawasaki (JP); Satoshi Nagano, Kunitachi (JP); Narihiro Oomoto, Ichikawa (JP)

(73) Assignee: Hitachi, Ltd., Tokyo (JP)

( * ) Notice: Subject to any disclaimer, the term of this patent is extended or adjusted under 35 U.S.C. 154(b) by 489 days.

(21) Appl. No.: 12/535,900

(22) Filed: Aug. 5, 2009

(65) Prior Publication Data
US 2010/0050274 A1 Feb. 25, 2010

(30) Foreign Application Priority Data

Aug. 22, 2008 (JP) ................................. 2008-213462

(51) Int. Cl.
G06F 7/04 (2006.01)
(52) U.S. Cl. ................. 726/26; 726/27; 726/28; 726/29
(58) Field of Classification Search ............... 726/26–29
See application file for complete search history.

(56) References Cited

U.S. PATENT DOCUMENTS

| | | | | |
|---|---|---|---|---|
| 6,954,861 | B2 * | 10/2005 | Watkins et al. | 726/28 |
| 7,461,262 | B1 * | 12/2008 | O'Toole, Jr. | 713/182 |
| 7,516,496 | B2 * | 4/2009 | Watkins et al. | 726/29 |
| 2007/0250715 | A1 * | 10/2007 | Cai et al. | 713/176 |
| 2008/0141379 | A1 * | 6/2008 | Schmelzer | 726/26 |
| 2008/0263637 | A1 * | 10/2008 | Nonaka et al. | 726/4 |

FOREIGN PATENT DOCUMENTS

| | | |
|---|---|---|
| CN | 101047576 A | 10/2007 |
| JP | 2001-351322 A | 12/2001 |
| JP | 2005-266699 A | 9/2005 |
| JP | 2007-207051 A | 8/2007 |
| JP | 2008-186330 A | 8/2008 |

* cited by examiner

Primary Examiner — Kambiz Zand
Assistant Examiner — Teshome Hailu
(74) Attorney, Agent, or Firm — Mattingly & Malur, PC

(57) ABSTRACT

A content control system capable of controlling delivery destinations of user contents in respective groups, identifying each group through which each content is delivered, and delivering information/advertisements according to the attribution information of the content. In a content control server, group identifying information is set in each user content to be uploaded to or downloaded from a group memory area corresponding to a gateway ID from a terminal through a gateway having a plurality of its subordinate terminals. The information identifies each gateway through which each object content is delivered according to the gateway ID. The control system controls the delivery destination of each content according to the combination of the content delivery route and a table prepared in the content control server.

11 Claims, 26 Drawing Sheets

FIG. 5

| SERVICE ID (1811) | UPPER LIMIT NUMBER OF PASSED GROUPS (1812) |
|---|---|
| 1 | 2 |
| .... | .... |

| GATEWAY ID (1821) | USER ID (1822) |
|---|---|
| 30A | 70A-1 |
|  | 70A-2 |
| 30B | 70B-1 |
|  | 70B-2 |
| 30C | 70C-1 |
|  | 70C-2 |
| .... | .... |

| GATEWAY ID | CONTENT ID | DELIVERY-PERMITTED GATEWAY ID |
|---|---|---|
| 30A | X | 30B |
|  |  | 30D |
| 30B | X |  |
|  | Y |  |
| .... | .... | .... |

| GATEWAY ID | ACCEPTANCE-PERMITTED GATEWAY ID |
|---|---|
| 30A | 30B |
|  |  |
| 30B | 30A |
|  |  |
| 30C | 30B |
|  |  |
| .... | .... |
| 30S | * |
| .... | .... |

| GATEWAY ID | USER ID | DISTRICT |
|---|---|---|
| 30A | – (HOME) | YOKOHAMA |
| | 70A-1 | TOKYO |
| | 70A-2 | |
| 30B | – (HOME) | |
| | 70B-1 | |
| | 70B-2 | |
| 30C | – (HOME) | |
| | 70C-1 | |
| | 70C-2 | |
| .... | .... | .... |
| 30S | – (HOME) | KAWASAKI |
| .... | .... | .... |

FIG. 10

| DISTRICT | TIME BAND | INFORMATION ID |
|---|---|---|
| YOKOHAMA | AM | INFORMATION 1 |
| | PM | INFORMATION 2 |
| TOKYO | AM | INFORMATION 3 |
| | PM | INFORMATION 4 |
| KAWASAKI | AM | INFORMATION 5 |
| | PM | INFORMATION 6 |
| .... | .... | .... |

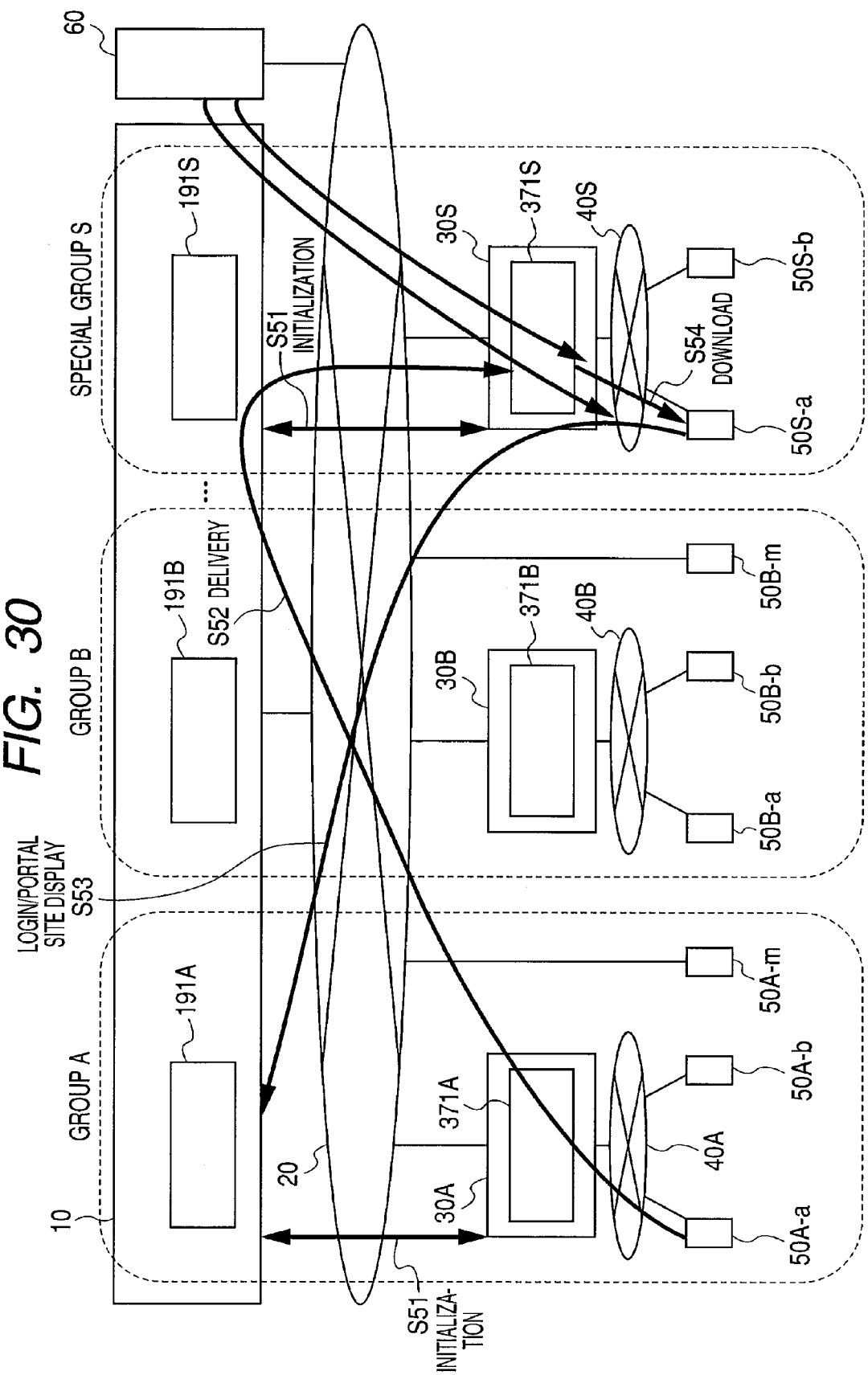

CONTENT CONTROL SYSTEM

CLAIM OF PRIORITY

The present application claims priority from Japanese patent application JP 2008-213462 filed on Aug. 22, 2008, the content of which is hereby incorporated by reference into this application.

FIELD OF THE INVENTION

The present invention relates to a user content delivery control system usable among plural servers through a network, more particularly to a content control system capable of controlling the content delivery destinations in respective groups, identifying each group through which each content is passed, and delivering information and advertisements according to respective attributes.

BACKGROUND OF THE INVENTION

Conventional content control systems that deliver contents through networks respectively have employed such techniques as the DRM (Digital Rights Management), digital watermarking, and user authorization. The DRM technique aims at protecting the copy rights of pay digital contents, etc. and is used to restrict copying of audio and video content files delivered from servers to user terminals, respectively.

The watermarking technique is used mainly for two purposes; one is to insist the copyrights of contents and the other is to identify illegal users of contents. For the former, the copyright owner ID is buried in each of those contents. For the latter, the user ID of each content is buried in the content. Particularly, the latter technique employs the following two cases; in one case, terminals bury such watermarks and in the other case, servers bury such watermarks. For example, JP-A No. 2007-207051 discloses one of the latter cases; the servers bury such watermarks.

The user authorization technique authorizes each user with use of the user ID, password, etc. Each server can control the delivery of contents according to the result of such authorization.

SUMMARY OF THE INVENTION

The DRM technique can realize comparatively accurate controlling of the delivery of contents. However, this method requires a content delivery control mechanism to be provided at each terminal that uses those contents. And this technique has been confronted with a problem that if plural diversified subordinate terminals are connected to a gateway (e.g., a home gateway) and the gateway is connected to a server through a network, the terminals come to be much loaded. In this case, the gateway can take over such heavy load of those terminals, but this method comes to lower the convenience of those terminals. This is why the method is not suitable so much for the utilization of such user contents. In case of the digital watermarking technique, if terminals bury watermarks, the terminals or the gateway also comes to be much loaded. This has been a problem, although the problem can be avoided if servers bury those watermarks. It is true that the digital watermarking technique that buries the user ID in each content, as well as the user authorization technique are effective if delivery of contents is controlled according to each user ID. But, those techniques will not be so effective in a case in which plural diversified terminals are connected to a gateway and the users are required to use those contents in each group separately. Under such circumstances, it is an object of the present invention to provide a content control system capable of controlling delivery destinations of user contents in respective groups and capable of identifying each group through which each content is passed with respect to the contents to be exchanged between a management server that manages contents and a gateway server.

In one aspect, the content control server of the present invention has a memory area corresponding to each group identifier that identifies a group consisting of plural users. The content control server accepts an acquisition request from external through a network with respect to a first content to be stored in any of the memory areas and compares the identifier of the acquisition request source with the group identifier corresponding to the memory area. If both the identifiers match with each other, the control server permits the delivery of the first content and sends the first content to the acquisition request source. On the other hand, if both the identifiers do not match with each other, the control server determines whether or not a predefined first content acquisition permission identifier matches with the identifier of the acquisition request source. If both the identifiers match each other, the control server sends the first content to the acquisition request source.

According to an aspect of the present invention, therefore, the content control server comes to be able to manage user contents in respective groups.

BRIEF DESCRIPTION OF THE DRAWINGS

FIG. 5 is a table 1, which holds a list of the upper limit number of passed groups;
FIG. 6 is a table 2, which holds a gateway-user correspondence list;
FIG. 7 is a table 3, which holds a content list (table 3);
FIG. 8 is a table 4, which holds a list of acceptance permitted gateways;
FIG. 9 is a table 6, which holds a gateway-user-attribute information correspondence list;
FIG. 10 is a table 6, which holds an attribute-information correspondence list.

FIG. 30 is a diagram for describing the sequences carried out in the fifth embodiment.

DETAILED DESCRIPTION OF THE PREFERRED EMBODIMENTS

Hereunder, there will be described the first embodiment of the present invention with reference to the accompanying drawings.

Figure 1:
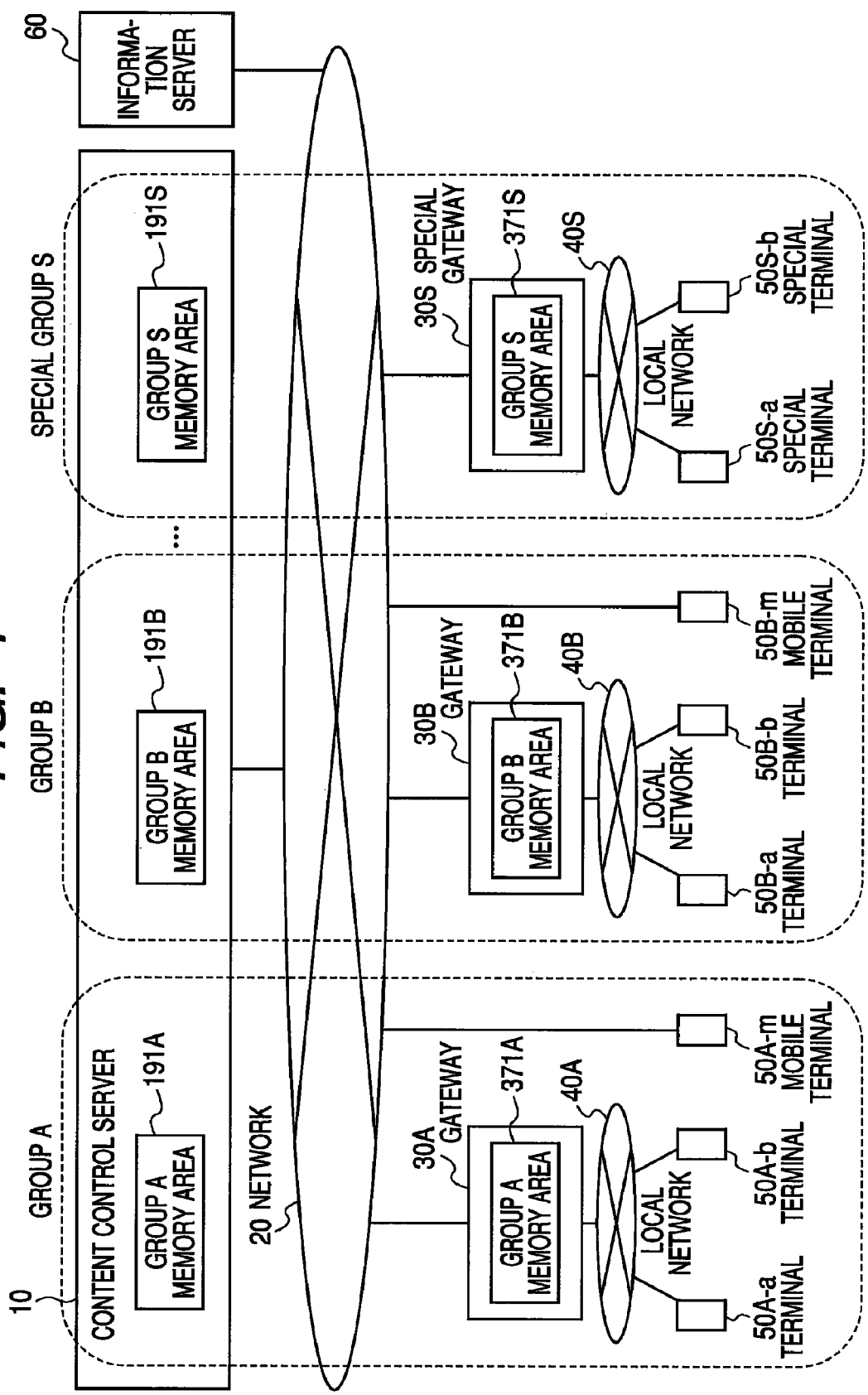
FIG. 1 is a block diagram of a content control system.

FIG. 1 is a block diagram of a content control system in a configuration employed in this first embodiment. In FIG. 1, a content control server 10 is connected to plural gateways 30 and an information server 60 through a network 20 respectively. Each gateway 30 is connected to plural terminals 50 through local networks 40 respectively. Mobile terminals that are not subordinate to any of those gateways 30 are also connected to the network 20. And plural users 70 access the content control system through those terminals 50 respectively.

Here, it is premised that a gateway 30A (e.g., a home gateway), plural terminals 50A-a and 50A-b and a mobile terminal 50A-m that are subordinate to the gateway 50A respectively, as well as plural users 70A-1 and 70A-b (e.g., family members such as father and mother) are all included in a group A. It is also premised here that the group A has a memory area in each of the gateway 30A and in the content control server 10 (371A and 191A) and can store such contents as video, photo, etc. in those memory areas.

As shown in FIG. 1, the content control system includes plural groups (A, B, . . . ). The content control system also includes a special group S usable by other groups. The special group S includes a special gateway 30S connected to plural subordinate special terminals 50S-a, 50-Sb, etc. Those special terminals 50S are, for example, an outdoor digital signage terminal, a print shot terminal, etc. The users in the groups A and B can use those special terminals to view, listen to, and print out such contents as video, photos, etc. Hereunder, the subject service is expected to enable the delivery of user contents in each group to be controlled separately.

Now, the first embodiment of the present invention will be described with respect to how a user content is uploaded from a terminal that is subordinate to a gateway to the content control server 10, as well as how the delivery destination of each user content is controlled. At first, there will be described the content control server 10 and the gateway 30 employed in this first embodiment.

Figure 2:
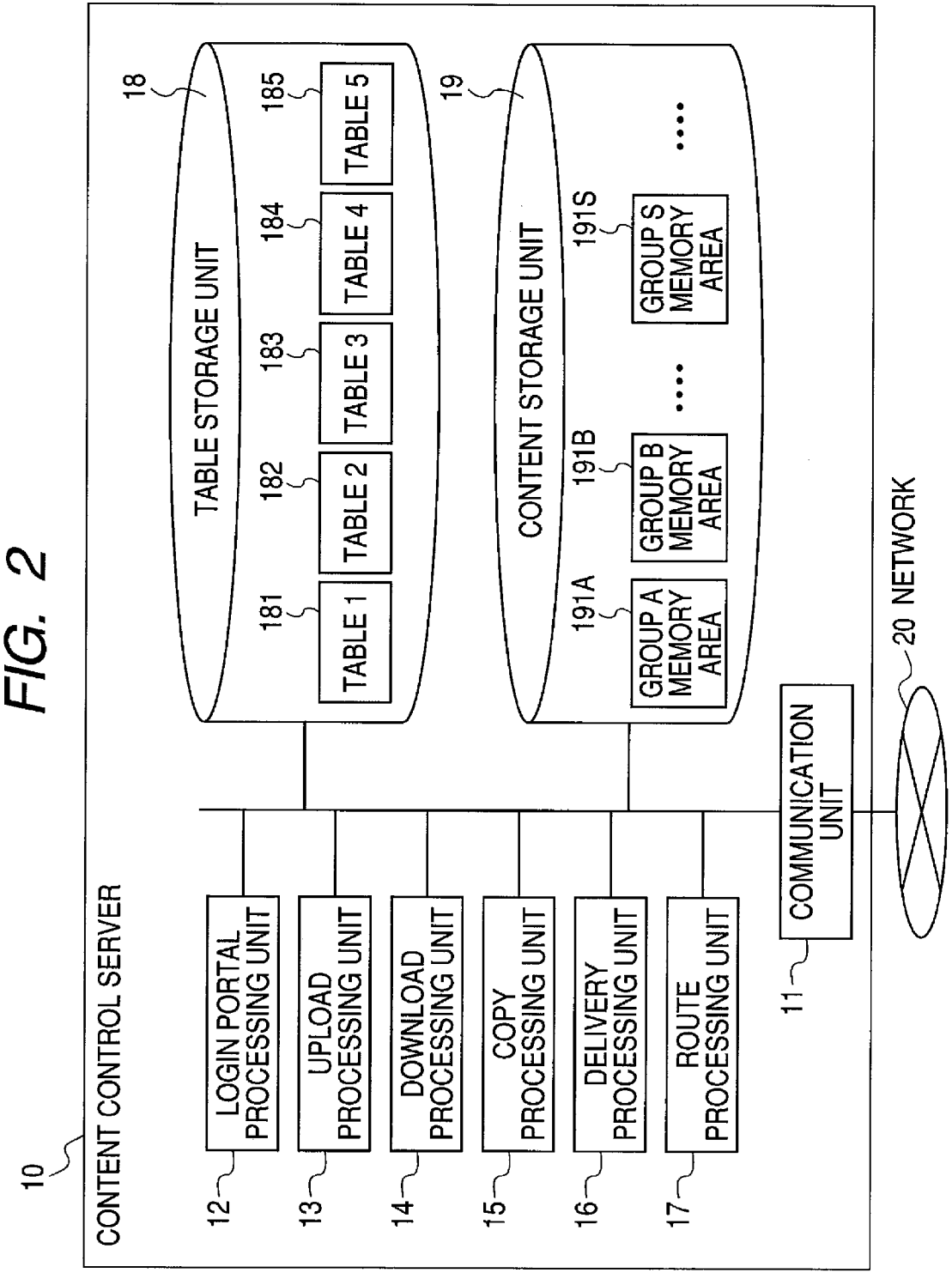
FIG. 2 is a block diagram of a content control server.

FIG. 2 is a block diagram of the content control server 10. The content control server 10 includes a communication unit 11 that functions as an interface with the network 20; a login/portal processing unit 12 that carries out various controls, an upload processing unit 13; a download processing unit 14; a copy processing unit 15; a delivery processing unit 16; and a route processing unit 17. Those processing units can be united into one CPU or they may be formed as control units, each of which is equivalent to a CPU. In addition, those processing units may be formed by hardware items respectively or their processings may be realized by software programs read from a storage medium by one or more processors. Furthermore, the content control server 10 includes a table storage unit 18 that stores tables as data, as well as a content storage unit 19 that stores user contents as data.

Among the server components shown in FIG. 2, the communication unit 11 exchanges data with the gateways 30, the terminals 50, and the information server 60 through the network 20 and passes processings to those processing units according to the message contents respectively. The login/portal processing unit 12 accepts a login processing from each of the gateways 30 and the terminals 50 and displays the subject portal site. The upload processing unit 13 receives contents uploaded from each of the gateways 50 and the terminals 50 and stores those received contents in the content storage unit 19. The download processing unit 14 takes out each object content stored in the content storage unit 19 for each of the gateways 30 and the terminals 50 and downloads the content to the object unit. The copy processing unit 15 copies each object content stored in the content storage unit 19 from a memory area of a group to another memory area of another group. The table storage unit 18 stores various types of tables as data. The content storage unit 19 stores contents as data. The content storage unit 19 has a memory area 191 corresponding to each group. This memory area 191 consists of plural 1 GB spaces, which are allocated, for example, as a space between an address and another address in the memory area 191A of the group A, another space between an address and another address in the memory area 191B of the group B, etc. on a hard disk of the content control server 10.

Figure 3:
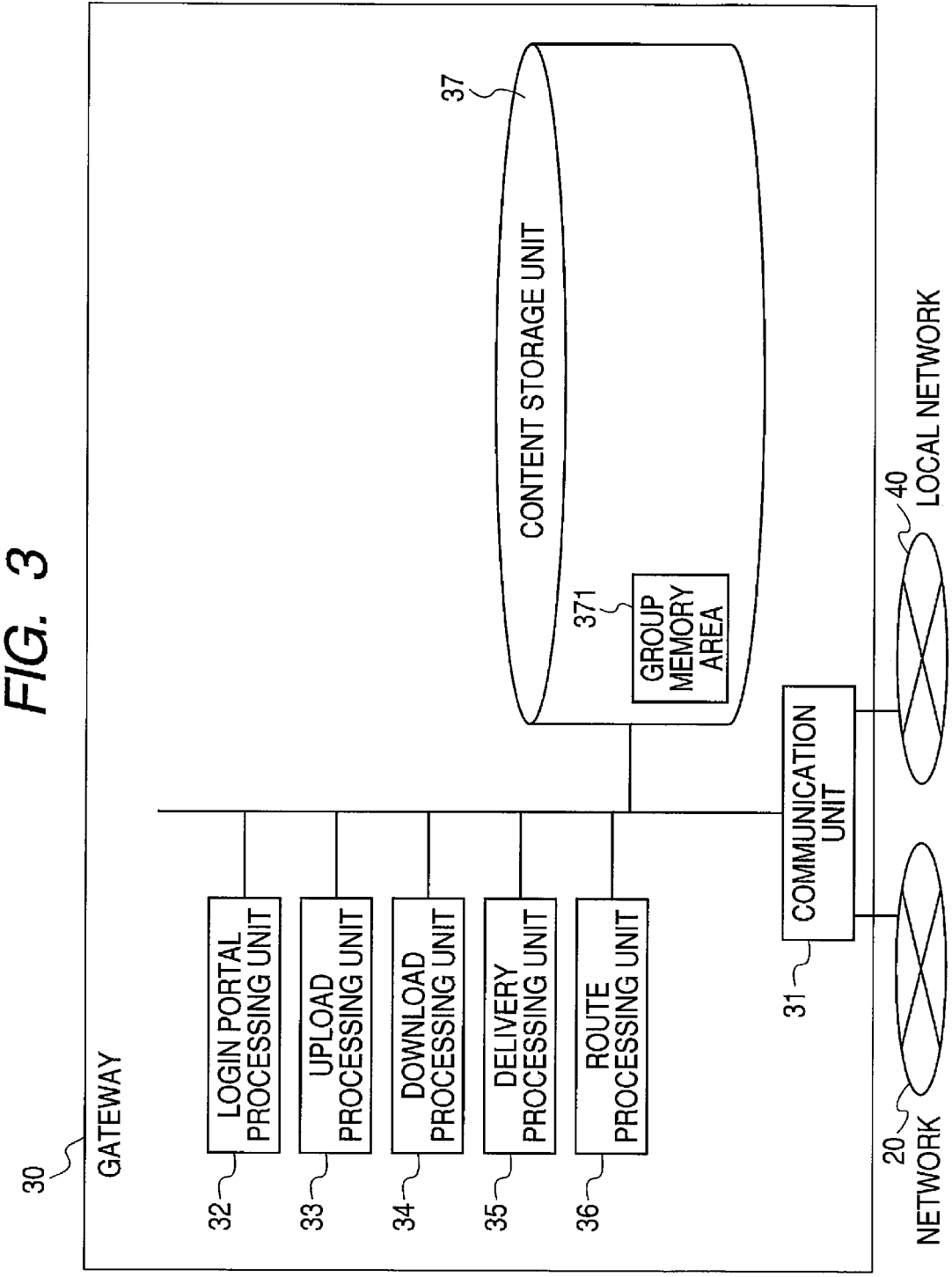
FIG. 3 is a block diagram of a gateway.

FIG. 3 is a block diagram of the gateway 30. In FIG. 1, the gateways are shown as the gateways 30A, 30B, etc. In FIG. 3, however, those gateways are represented by one gateway 30. The gateway 30 consists of a communication unit 31 that functions as an interface with the network 20 and a local network 40; a login/portal processing unit 32 that carries out various controls; an upload processing unit 33; a download processing unit 34; a delivery processing unit 36; a route processing unit 37; and a content storage unit 38 that stores contents as data.

Among the server components shown in FIG. 3, the communication unit 31 exchanges messages with the content control server 10 connected through the network 20 and the terminals 50 connected through the local network 40 and passes processings to the processing units according to the message contents respectively. The login/portal processing unit 32 logs in the content control server 10 in response to a portal site display request received from a terminal 50. The upload processing unit 33 uploads contents uploaded from the terminals 50 to the content control server 10 respectively. The download processing unit 34 receives contents downloaded from the content control server 10, then transfers those contents to the terminals 50 respectively. The route processing unit 37 stores contents as data in the memory area 371 as needed. This memory area 371 consists of a 1 GB space allocated between an address and another address on a hard disk, for example, in the gateway 30A.

Next, there will be described the tables 1, 3, and 4 employed in this first embodiment.

FIG. 5 is a table 1 having a list of the upper limit number of passed groups. This list 181 (table 1) denotes a correspondence between the service ID 1811 and the upper limit number of passed groups 1812. The service ID 1811 is an identifier of each service supplied by this content control system. Here, the subject service is expected to enable the delivery of user contents to be controlled in each group separately. The service ID is defined as 1 here. The number of passed groups means the number of the group memory areas 191 or 371 through which a subject content is passed in the content control server 10 belonging to the subject group in FIG. 1. However, even if a memory area belonging to a group is passed twice or more, it is counted as just one passing. For example, if a content is passed through the memory area 191A of the group A and the memory area 191B of the group B respectively, the number of passed groups is 2. Because the upper limit number of passed groups is set as an entry of the upper limit number of passed groups 1812 here, 2 is set as an entry of the field 1812 with respect to the setting of expected service ID 18111=1. In the above example, this means that the content cannot be passed through the memory area 191C of the group C, since the upper limit is exceeded. This is why the system can restrict the delivery destinations.

FIG. 7 is a content list 183 (table 3). The list 183 denotes a correspondence among the gateway ID 1831, the tent ID 1832, and the delivery-permitted gateway ID 1833. The gateway ID 1831 denotes a unique identifier of each gateway in the content control system. The content ID 1832 denotes a unique identifier of each content handled in the content control system. And the delivery-permitted gateway ID 1833 denotes a unique identifier of each gateway, which is permitted to process the object request (display, download, or copy) related to the delivery of the subject content. For example, assume now that a subject content is stored in the memory area 191A of the group A in the content control server 10. And as shown in FIG. 7, if 30B and 30D are set as entries of the delivery-permitted gateway ID 1833 with respect to the gateway ID 1831=30A and the content ID 1832=x, the requests of the processings (display, download, and copy) related to the delivery of the content x from the gateways 30B and 30D are permitted, but the requests of those processings from the gateway 30C are rejected. However, for example, the requests of the processings related to the content delivery from the gateway 30A to the memory area 191A of the group A are permitted as standard, so it can be omitted here to write the same ID as that written in the gateway ID 1831 as an entry of the delivery-permitted gateway ID 1833. In addition, if nothing is set in the delivery-permitted gateway ID 1833, it denotes that all the requests (display, download, and copy) related to the content delivery from the gateways except for that having the gateway ID 1831 are rejected.

FIG. 8 is a table 4 having a list of acceptance permitted gateways 184. The table 4 (the list 184) denotes a correspondence between the gateway ID 1841 and the acceptance-permitted gateway ID 1842. The acceptance-permitted gateway ID 1842 denotes a gateway of which processing requests are accepted with respect to the processings (upload, copy, or delivery) related to the subject content and with respect to both of the group memory area 371 of the gateway 30 and the group memory area 191 in the corresponding content control server 10. For example, as shown in FIG. 8, if "acceptance-permitted gateway ID 1842=30B" is set with respect to "gateway ID 1841=30A", the processing requests (upload, copy, and delivery) related to the contents acceptance from the gateway 30B with respect to the group memory area 371A and the group memory area 191A are permitted while the processing requests from the gateway 30C are rejected. In this case, because processing requests from the gateway 30C with respect to the memory area 191A of the group A are permitted as standard, there is no need to write the same ID as that in the gateway ID 1841 as an entry of the acceptance-permitted gateway ID 1842. If no entry is set for the acceptance-permitted gateway ID 1842, it means rejection of the processing requests (upload, copy, and delivery) related to the contents acceptance from all the gateways other than that set for the gateway ID 1841.

Next, there will be described some contents used in the first embodiment.

Figure 11:
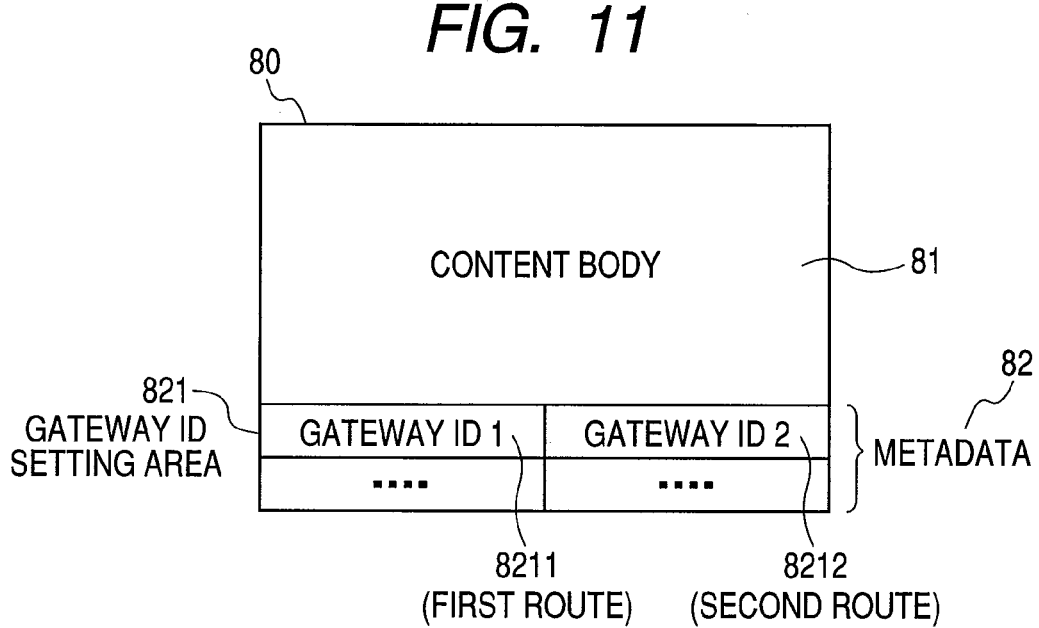
FIG. 11 is a configuration diagram of a content.

FIG. 11 is a configuration diagram of a content body. A content 80 consists of a content body 81 and metadata 82, which is information added to the content 80. The metadata 82 consists of plural information entries. A gateway setting entry 821 is among those information entries. The gateway setting entry 821 denotes either the group memory area 191 in the content control server 10 belonging to the subject group or the group memory area 371 in the gateway 30 through which the subject content is passed in FIG. 1 as the gateway ID of the corresponding group. In other words, the setting of the entry 821 is equivalent to the subject content route in this content control system. However, if a content is passed through two or more memory areas of the same group, the number of passed memory areas is counted as just one memory area. The entry of the gateway setting 821 denotes the upper limit number of passed groups described with reference to FIG. 5. For example, as shown in FIG. 5, if the upper limit number of passed groups is 2, two gateway IDs are set (8211 and 8212) as a gateway ID setting entry 821 as shown in FIG. 11. If a content is passed through the memory area 191A of the group A and through the memory area 191B of the group B, the content control server 10 sets 30A as the gateway ID in the gateway ID setting entry 8211 and 30B as the gateway ID in the gateway ID setting entry 8212 respectively.

In this case, in addition to write a gateway ID in the non-rewritable metadata added to the subject content so as to set a gateway ID as a gateway ID setting entry 821, it is also possible to bury the watermark in the content by using the gateway ID key as a key. In any of the methods, the information is added directly to the subject content and it cannot be rewritten. Therefore, as to be described later, it is possible to determine which route is taken to pass the content (e.g., the content is sent out from the group A and passed through the group B). Furthermore, the anonymity of each content owner can be assured so as to be hidden from users, for example, by encoding the gateway ID.

Next, there will be described the sequences carried out in the first embodiment.

Figure 27:
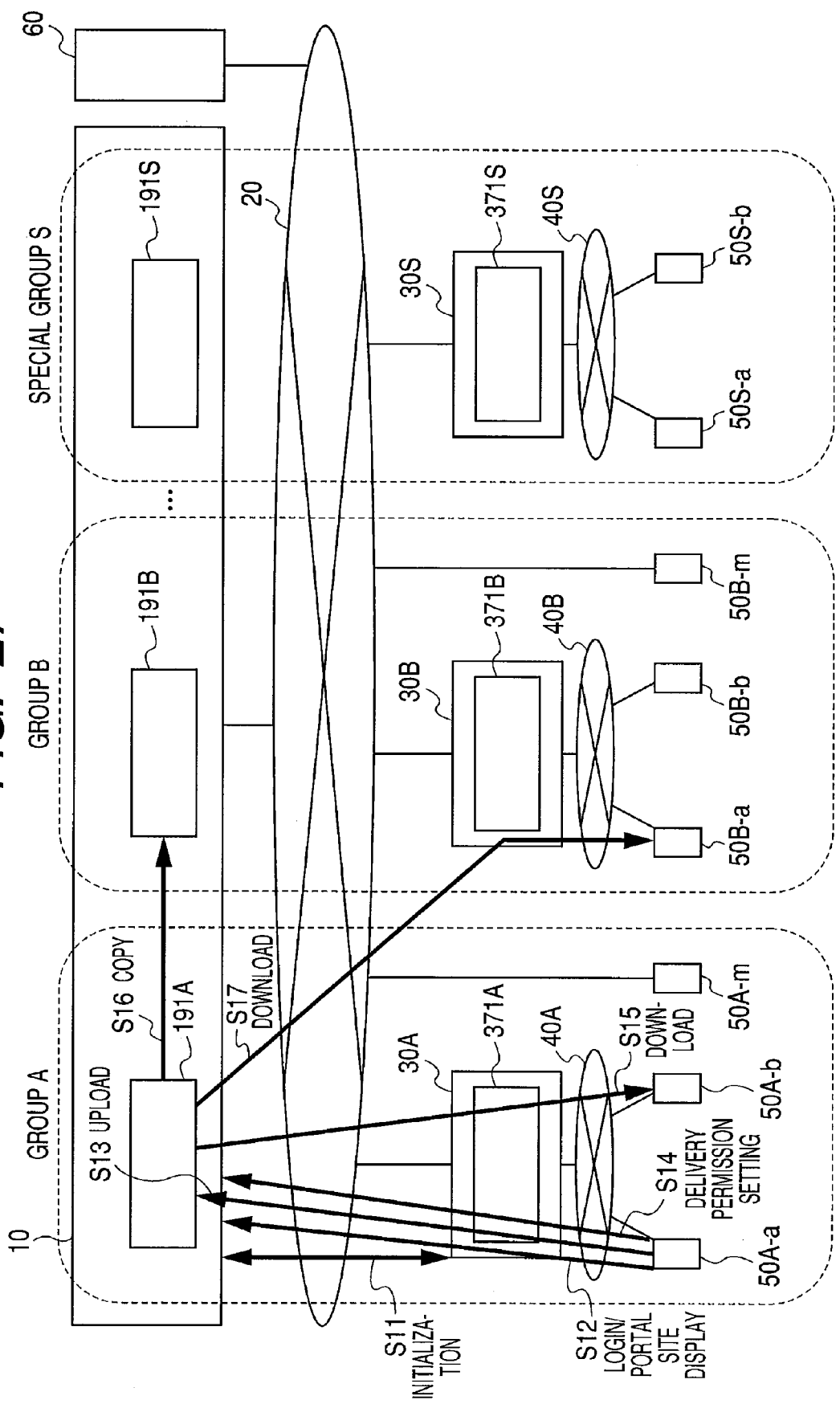
FIG. 27 is a diagram for describing the sequences carried out in the first embodiment.

FIG. 27 is a diagram for describing those sequences carried out in the first embodiment. The sequences are an initialization sequence S11, a login/portal site display sequence S12, an upload sequence S13, a delivery permission sequence S14, a download sequence S15, a copy sequence S16, and a download to another gateway sequence S17.

At first, the initialization sequence S11 will be described. In this initialization sequence S11, a subject gateway ID is initialized between each gateway 30 and the content control server 10. Here, the gateway 30A will be picked up as an example so as to describe the sequence S11. It is premised here to pick up a service for controlling the delivery of user contents in each group separately. And if the user 70A-1 joins this service while the gateway 30A is assumed as a home gateway, the content control server 10 uses an OSGi (Open Services Gateway initiative) frame work bundle to install the object program in the gateway 30A remotely. At this time, the content control server 10 assigns the gateway ID=30A to each gateway in the content control system as a unique identifier according to the gateway identification information. This gateway ID is also notified to each gateway beforehand. Then, the content control server 10 writes this gateway ID as an entry of the gateway ID 1831 in the content list (table 3) 183 shown in FIG. 7. At the initialization time, the entries of both the content ID 1832 and the delivery-permitted gateway ID 1833 are still blank with respect to the written entry of the gateway ID 1831. And the same gateway ID is also written as an entry of the gateway ID 1841 in the acceptance permitted gateways list (table 4) 184 shown in FIG. 8. At the initialization time, the entry of the acceptance-permitted gateway ID 1942 is also blank. This gateway ID is hidden from users so as to be protected from accesses of illegal users. This processing is also carried out for other gateways 30B, etc.

Next, there will be described the login/portal site display sequence S12. In this sequence S12 shown in FIG. 27, the user 70A-1 accesses the content control server 10 through the subordinate terminal 50A-a of the gateway 30A. Concretely, for example, the user 70A-1 issues a portal site display request to the content control server 10 by selecting the URL using the bookmark of the web browser through the terminal 50A-a (e.g., a net TV terminal). Then, the gateway 30A receives the request and logs in the content control server 10 to relay the portal site display request received from the content control server 10 to the terminal 50A-a, thereby the portal site is displayed on the browser screen of the terminal 50A-a.

Figure 21:
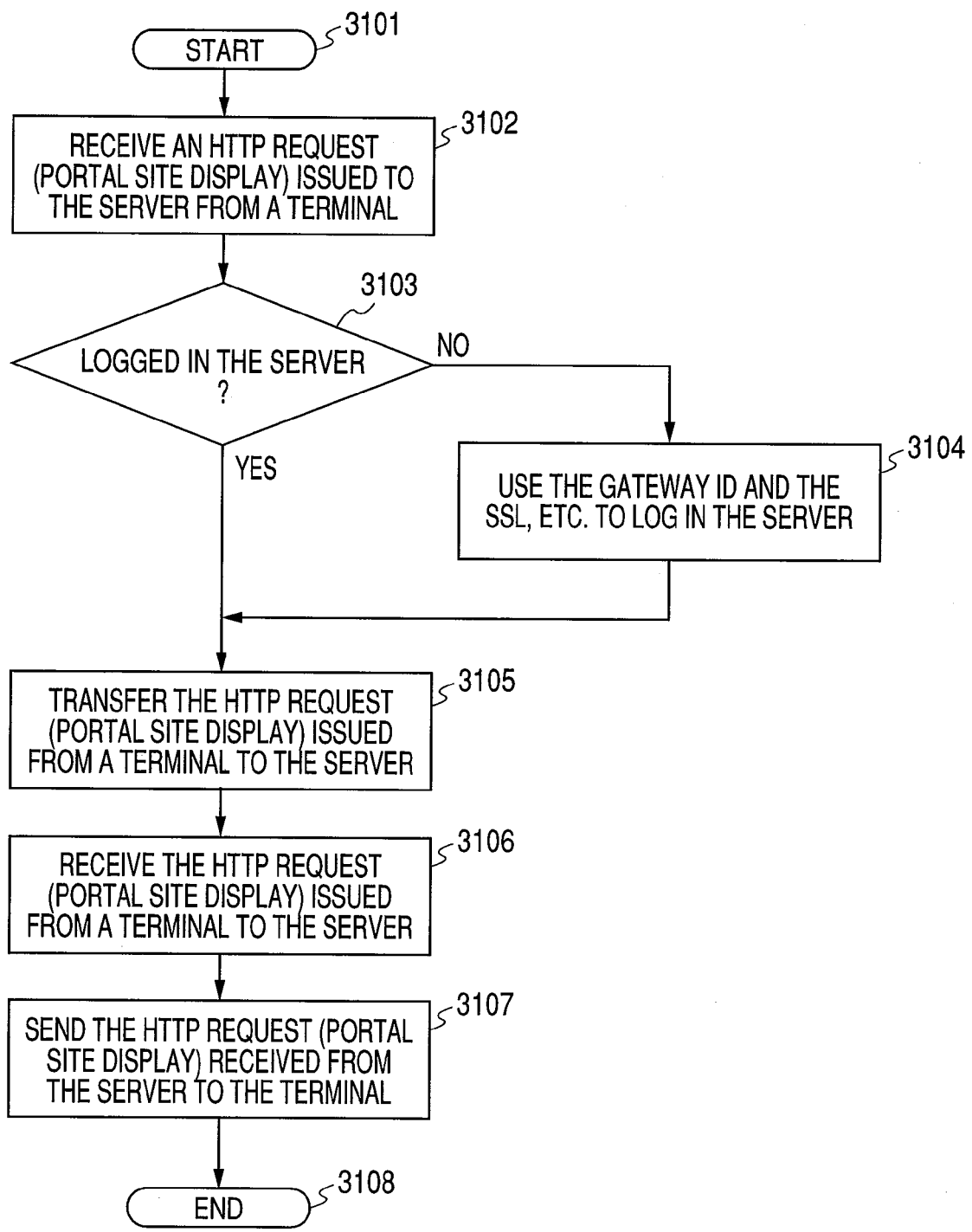
FIG. 21 is a flowchart of the processings of a gateway in a login/portal site display sequence.

Next, there will be described how the gateway 30A will process the login/portal site display sequence S12 with reference to the flowchart shown in FIG. 21. Upon receiving an HTTP request (portal site display) issued from the terminal 50A-a to the content control server 10 at the communication unit 31 (3102), the gateway 30A does not log in the content control server 10 yet (3103). Thus the login/portal processing unit 32 logs in the content control server 10 with use of the gateway ID and an SSL or the like (3104). As described in the initialization sequence S11, the gateway ID used here is what is assigned from the content control server 10. When the login is accepted, the login/portal processing unit 32 transfers the HTTP request (portal site display) received from the terminal 50A-a to the content control server 10 (3105), then receives the HTTP response (portal site display) from the content control server 10 (3106) and transfers the response to the terminal 50A-a (3107).

Figure 12:
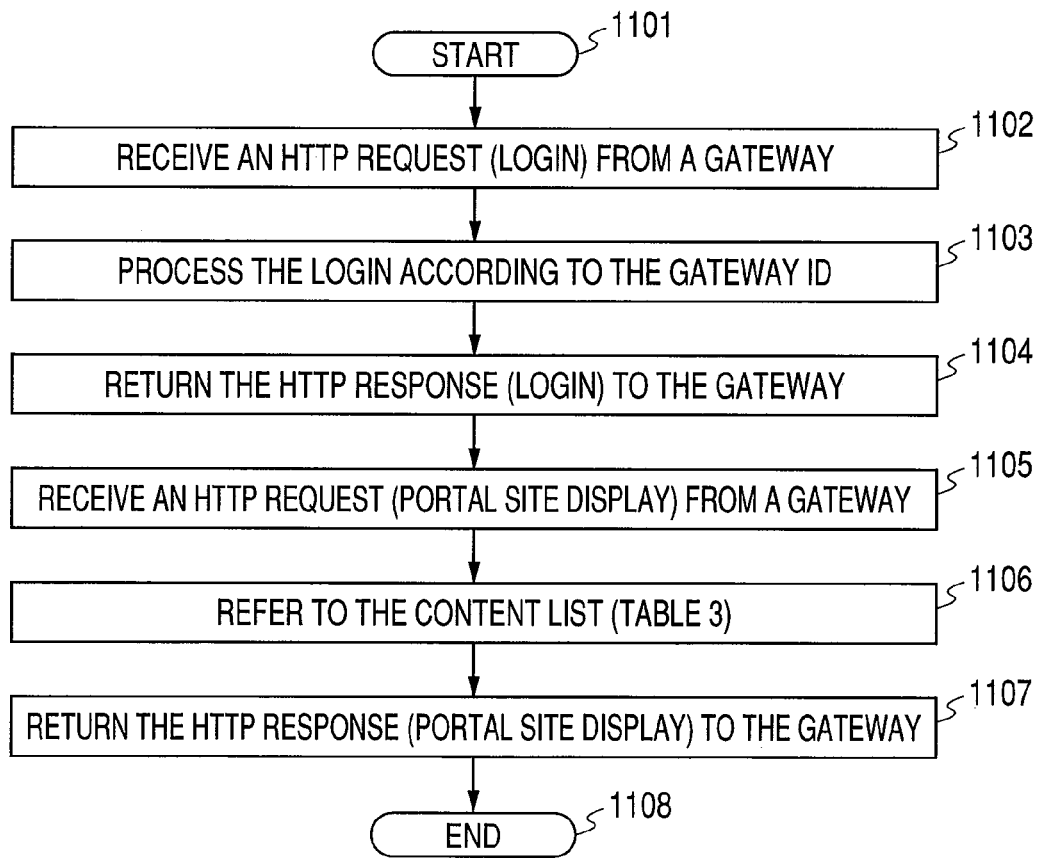
FIG. 12 is a flowchart of the processings of the content control server in a login/portal site display sequence.

Next, there will be described how the content control server 10 process the login/portal site display sequence S12 with reference to the flowchart shown in FIG. 12. When the content control server 10 receives an HTTP request (login) from the gateway 30A at the communication unit 11 (1102), the login/portal processing unit 12 carries out the login processing according to the gateway ID (1103) and returns the HTTP response (login permit) to the gateway 30A (1104). Then, the login/portal processing unit 12, upon receiving an HTTP request (portal site display) from the gateway 30A (1105), refers to the content list (table 3) stored in the table storage unit 18 (1106). As described in the initialization sequence S11, at this time, the entries of the content ID 1832 and the delivery-permitted gateway ID 1833 are still blank with respect to the entry of the gateway ID=30A in the content list (table 3) shown in FIG. 7. Thus the login/portal processing unit 12 creates a portal screen that includes thumbnails, etc. of contents (there is no contents yet) in the content list (table 3) and returns the HTTP response (portal site display) to the gateway 30A (1107).

As a result, the user 70A-1 comes to be able to access the content control server 10 to browse the portal site display screen in the group A memory area 191A.

As described above, because each gateway 30 carries out security and vicarious other proxy processings such as login and portal site display the application level, each of its subordinate terminals can access the content control server 10 without having any special and additional functions. The processings to be described below are also effect for such proxy processings similarly.

Next, the upload sequence S13 will be described. In this upload sequence S12 shown in FIG. 27, the user 70A-1 uploads a content to the content control server 10 through the subordinate terminal 50A-a of the gateway 30A. For example, the user 70A-1 uses the upload button on the portal site display screen from the terminal 50A-a to issue a request of uploading a user content X (e.g., a video file generated by a camera) to the memory area 191A of the group A in the content control server 10. Then, the gateway 30A accepts the upload request and uploads the content X to the content control server 10.

Next, there will be described how the gateway 30A processes the upload sequence S13 with reference to the flowchart shown in FIG. 22. At first, the gateway 30A receives an HTTP request (upload) issued from the terminal 50A-a to the content control server 10 at the communication unit 31 (3202), then the upload processing unit 33 transfers the HTTP request to the content control server 10 and uploads the content X to the content control server 10 (3203). At this time, the content X may be stored in the memory area 371A of the local group A in the gateway 30A so as to make it easier to use the content X later. Then, the upload processing unit 33 receives the HTTP response (upload permission/rejection) from the content control server 10 (3204). If the upload is permitted at this time, the upload processing unit 33 returns the HTTP response (upload completed) to the terminal 50A-a (3206).

Figure 13:
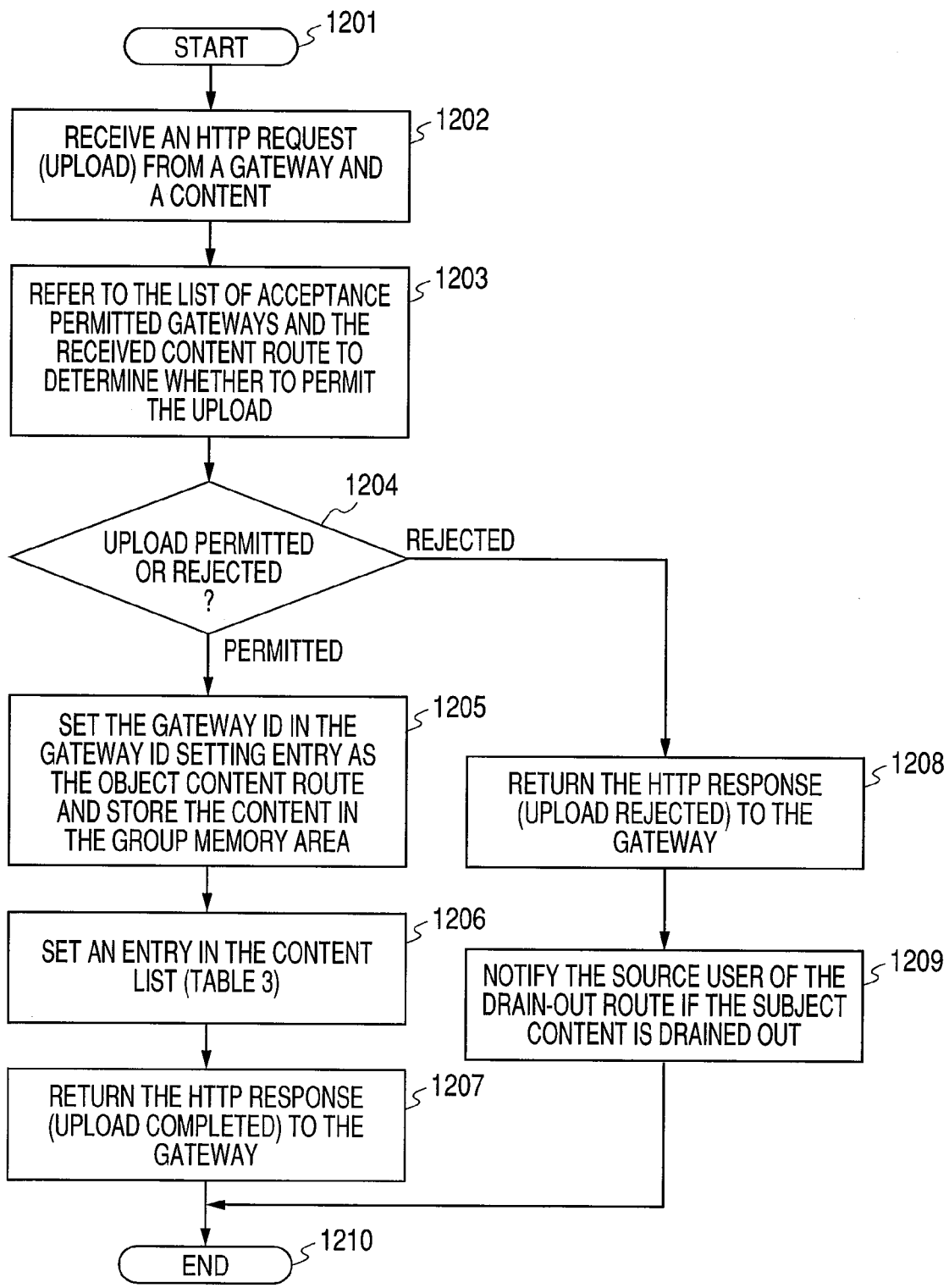
FIG. 13 is a flowchart of the processings of the content control server in an upload sequence.

FIG. 13 is a flowchart of the processings of the content control server 10 in the upload sequence S13. At first, the content control server 10 receives an HTTP request (upload) and a content X from the gateway 30A at the communication unit 11 (1202), then the upload processing unit 13 refers to the acceptance permitted gateways list (table 4) and the route of the received content to determine whether to permit/reject the upload (1203).

Concretely, assume now that an acceptance permitted gateway is set and as shown in FIG. 8, the acceptance permitted gateways list (table 4) 184 is set beforehand between the content control server 10 and each group user. Here, because the processing is updating a content from the terminal 50A-a to the memory area 191A of the group A through the gateway A, the upload request is accepted without writing the gateway ID as an entry of the acceptance-permitted gateway ID 1842 if the ID is the same as that written in the gateway ID 1841 as described with reference to FIG. 8. Thus "upload permitted" is set in the list (table 4).

Another element to determine whether to permit/reject the upload request (1203) is the route of the received content X. As described with reference to FIG. 5, because '2' is set as an entry of the upper limit number of passed groups 1812, the content control server 10 can write up to two routes for the content X (in the gateway ID setting entry 821 for the content X) as described with reference to FIG. 11. However, no route is written for the content X here (two gateway ID setting entries 821 are blank), so the route of the content X is also enabled for the upload. Consequently, the upload processing unit 13 sets "permit" in the step of the upload permission/ rejection shown in FIG. 13 (1204).

After this, as described with reference to FIG. 13, the upload processing unit 13 sets 30A as a gateway ID setting entry 8211 to determine the first route of the subject content X, then stores the content X in the memory area 191A of the group A in the content storage unit 19 (1205).

Then, the upload processing unit 13 sets an entry in the content list 183 (table 3) shown in FIG. 7 (1206). Here, an "X" is set as an entry of the content ID 1832 is set additionally with respect to the setting of gateway ID 1831=30A. At this time, no entry (blank) is set for the delivery-permitted gateway ID 1833. Then, the upload processing unit 13 returns the HTTP response (upload completed) to the gateway 30A (1207).

As a result, the user 70A-1 comes to able to upload the user content X existing in the terminal 50A-a to the memory area of the group A in the content control server 10.

Although the sequence is omitted here, in another similar example shown in FIG. 27, if the user 70A-1 wants to upload the user content X existing in the terminal 50A-a to the memory area 191B of the group B provided in the content control server 10, the above procedures can be used to upload the content X if 30A is set for the acceptance-permitted gateway ID 1842 with respect to the setting of gateway ID 1841=30B in the acceptance permitted gateways list (table 4) as shown in FIG. 8 and no entry is set for the route of the content X. At this time, as the routes of the content X, 30A is set as a gateway ID setting entry 8211 and 30B is set as the second route for a gateway ID setting entry 8212 simultaneously.

Next, the delivery permission sequence S14 will be described. In the sequence S14 shown in FIG. 27, the user 70A-1 sets "content delivery permission" for the content control server 10 through the subordinate terminal 50A-a of the gateway 30A. For example, if the user 70A-1 issues a request of delivery permission for the content X uploaded to the memory area 191A of the group A in the content control server 10 in response to an access from the gateway 30B by using the delivery permission button on the portal site display screen through the terminal 50A-a (net TV terminal), the gateway 30A accepts the request and makes the requested setting in the content control server 10.

In the sequence S14, the gateway 30A carries out only proxy operations required between the terminal 50A-a and the content control server 10, so the flowchart of the processings by the gateway 30A is omitted here. Although the processings of the content control server 10 are also omitted here, the login/portal processing unit 12 shown in FIG. 2 sets an entry in the content list 183 (table 3) existing in the table storage unit 18 as shown in FIG. 7. Here, 30B is set in a blank entry of the delivery-permitted gateway ID 1833 corresponding to the entries of gateway ID 1831=30A and content ID 1832=X. If 30D is set in another entry of the 1833 here, the result will be as shown in FIG. 7.

Next, the download sequence S15 will be described.

In the download sequence S15 shown in FIG. 27, the user 70A-2 downloads the content X existing in the memory area 191A of the group A in the content control server 10 by issuing the request from the subordinate terminal 50A-b of the gateway 30A. For example, if the user 70A-2 issues a request so as to download the content X from the memory area 191A to the terminal 50A-b by using the download button on the portal site display screen of the terminal 50A-b (e.g., a net TV terminal in another room), the gateway 30A accepts the download request, then downloads the content X from the content control server 10.

Figure 23:
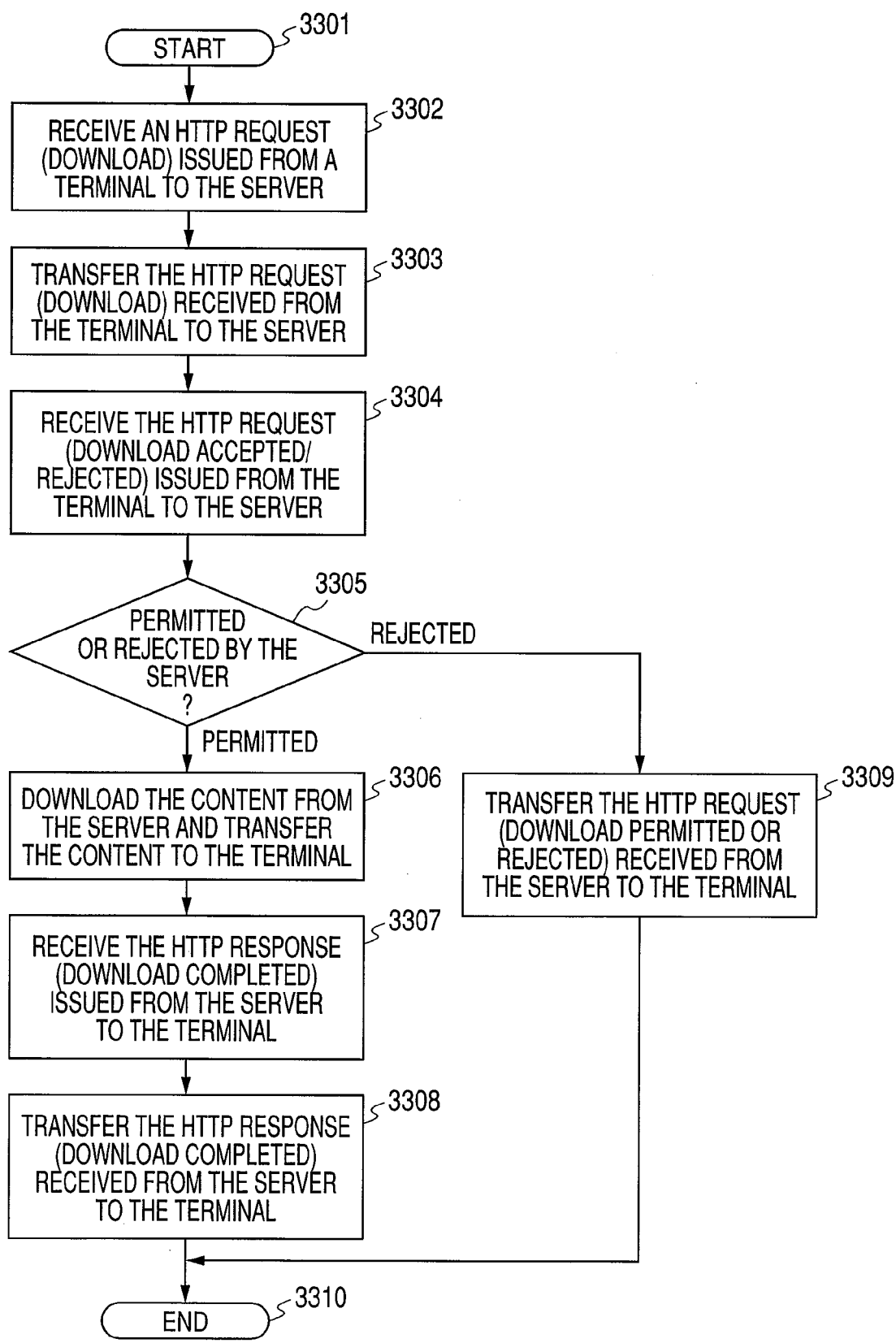
FIG. 23 is a flowchart of the processings of the gateway in a download sequence.

FIG. 23 is a flowchart of the processings of the gateway 30A in the download sequence S15. In the gateway 30A, at first, the download processing unit 34 transfers the HTTP request (download) issued from the terminal 50A-b to the content control server 10 (3303), since the request is addressed to the content control server 10 (3302). After this, the download processing unit 34 receives the HTTP response (download YES/NO) from the content control server 10 (3304). If the download is accepted (YES) (3305), the download processing unit 34 downloads the content X from the content control server 10, then transfers the content X to the terminal 50A-b (3306). At this time, in order to assure the convenience for using the content X later, the content X may be stored in the memory area 371A of the local group A in the gateway 30A. The download processing unit 34, upon receiving the HTTP response (download completed) from the content control server 10 (3307), returns the HTTP response (download completed) to the terminal 50A-b (3308).

Figure 14:
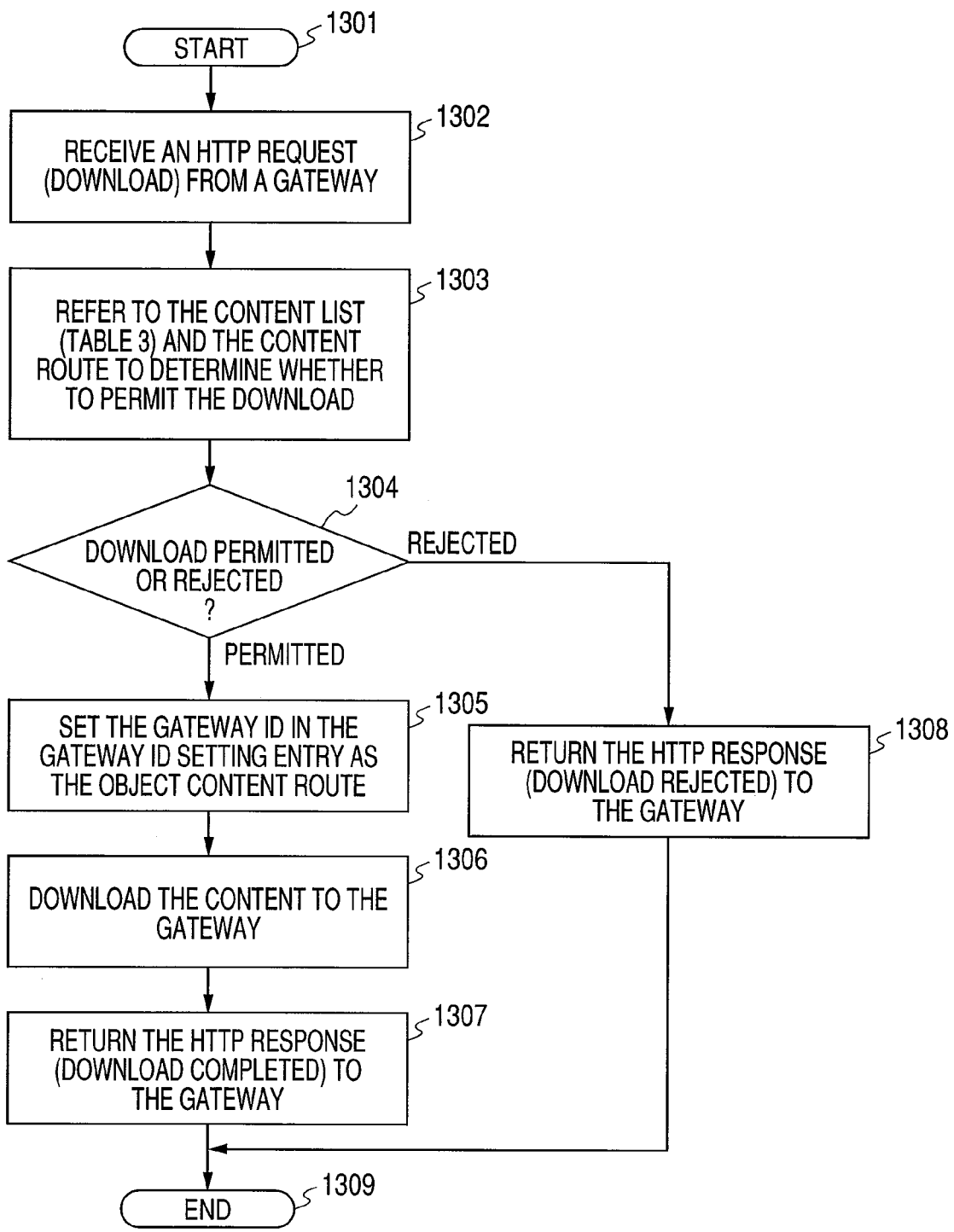
FIG. 14 is a flowchart of the processings of the content control server in a download sequence.

FIG. 14 is a flowchart of the processings of the content control server 10 in the download sequence S15. In the content control server 10, at first, the communication unit 11 receives an HTTP request (download) from the gateway 30A (1303), then the download processing unit 14 refers to the content list (table 3) and the route of the content to determine whether to permit/reject the download request (1303).

Here, in the content list (table 3) 183 is set "delivery permitted" as standard, since the request source gateway ID is 30A, which is the same as that set as an entry of the gateway ID 1831. Thus "download permitted" is set for the content list (table 3). And up to two routes can be written in the content control server 10 for the content X (in the content gateway ID setting entry 821), but gateway ID=30A is already set in the gateway ID setting entry 8211 as the first route, so there is no need to write the gateway ID=30A again here, which is within the upper limit. Thus, the download is also permitted for the content route. Consequently, the download processing unit 14 determines "permission" in step 1304 of determining whether to permit/reject the download. Then, control goes to the content route setting step (1305). As described above, there is no need here to set the same gateway ID, which is 30A. The download processing unit 14 thus downloads the content X to the gateway 30A (1306), returns the HTTP response to the object (1307), and exits the sequence S15.

Next, the copy sequence S16 will be described. In this copy sequence S16 shown in FIG. 27, from the subordinate terminal 50B-a of the gateway 30B, the user 70B-1 copies the content X stored in the memory area 191A of the group A into the memory area 191B of the group B in the content control server 10. The processings of the gateway 30A in this copy sequence S16 are almost the same as the proxy operations carried out between the terminal 50B-a and the content control server 10. Therefore, the description for the gateway flowchart will be omitted here.

Figure 15:
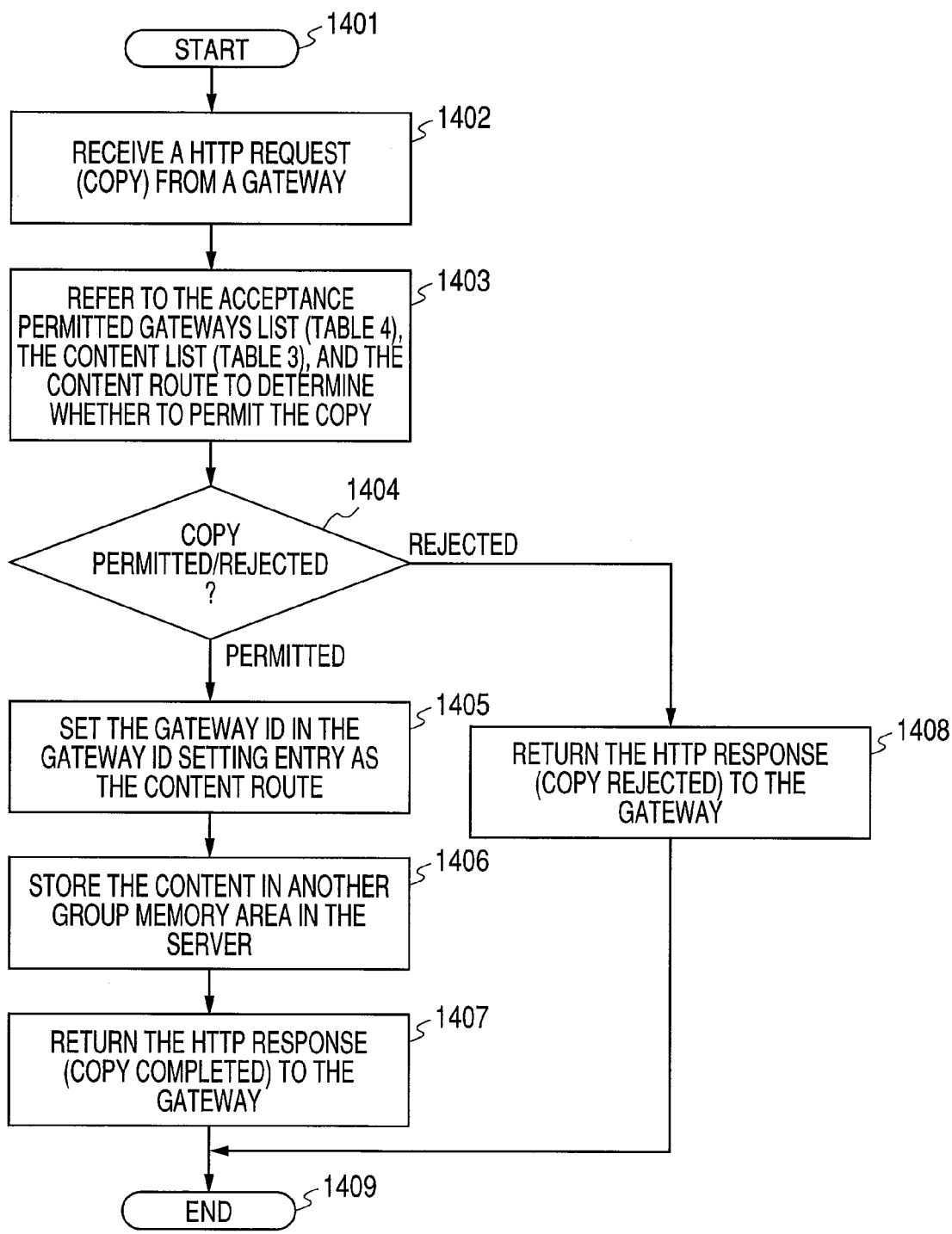
FIG. 15 is a flowchart of the processings of the content control server in a copy sequence.

Next, there will be described how the content control server 10 will process the copy sequence S16 with reference to the flowchart shown in FIG. 15. In the sequence S16, at first the copy processing unit 15 provided in the content control server 10 refers to the acceptance permitted gateways list (table 4), the content list (table 3), and the route of the content X to determine whether to permit/reject the copy request (1403). Here, 30B is set as an entry of the request source gateway ID, which is the same as that set in the gateway ID entry 1841 in the acceptance permitted gateways list (table 4) 184. Thus the gateway 30B is permitted for the copy request as standard. In addition, 30B is set in the delivery-permitted gateway ID entry 1833 in the content list (table 3) 183 with respect to the content X. Thus the delivery of the content X is permitted. Furthermore, the content control server 10 is permitted to write up to two routes for the content X (gateway ID setting entry 821 for contents). In this case, as the first route, gateway ID=30A is already set in the gateway ID setting entry 8211, but the second route can also be set here. This means that the copy is permitted for the content route. Consequently, the copy processing unit 15 determines that the copy request is acceptable (1404). Then, the copy processing unit 15 sets 30B in the gateway ID setting entry 8212 as the second content route (1405) and stores the content X in the memory area 191B of the group B (1406), returns the HTTP response to the request source, and exits the sequence S16 (1407).

In the above case, if the user 70C-1 wants to copy the content X that is already copied in the memory area 191B of the group B into the memory area 191C of the group C in the content control server 10 from the subordinate terminal 70C-a of the gateway 70C, the user's request (copy) is rejected even when "acceptance permitted" is set in the acceptance permitted gateways list (table 4) and "delivery permitted" is set in the content list (table 3). This is because "2", which is the upper limit number of groups to be passed, is set for the number of routes of the content X in the gateway ID setting entry 821. This is why the content control system of the present invention can limit the number of delivery destinations of contents.

Next, there will be described the download sequence S17 carried out to download contents from a gateway to another gateway.

In this download sequence S17, the user 70B-1 of the subordinate terminal 50B-a of the gateway 30B downloads the content X stored in the memory area 191A of the group A to the user's terminal 50B-a. In this sequence S17, the processings of the gateway 30B to be described below with reference to FIG. 23 are almost the same as those in the download sequence S15 described above. Thus the description of those processings will be omitted here.

As for the processings of the content control server 10, this sequence S17 is the same as the copy sequence S16. Thus the sequence S17 will also be described with reference to FIG. 14 (flowchart) and "permit" is set for the result of the determination of whether to permit/reject the download request (1303) just like in the copy sequence S16. And the download processing unit 14 sets 30B in the gateway ID setting entry 8212 as the second route of the content X (1305) and downloads the content X to the gateway 30B (1306). Also in this case, if the user 70C-1 of the subordinate terminal 70C-a of the gateway 70C wants to download the content X, the content control system of the present invention can limit the number of delivery destinations of the content X. This completes the description of all the sequences carried out in the first embodiment. Hereunder, there will be described how the content control server 10 is accessed from a mobile terminal that is subordinate to a gateway, as well as from a special terminal that is subordinate to a special gateway in the second embodiment of the present invention.

The content control server 10 and the gateway 30 employed in this second embodiment are the same as those in the first embodiment. Therefore, this second embodiment will also be described with reference to FIGS. 2 and 3. In this second embodiment, a table 2 is newly added to the tables employed in the first embodiment.

FIG. 6 is a gateway-user correspondence list (table 2). The list 182 (table 2) denotes a correspondence between the gateway ID 1821 and the user ID 1822. As described above, the users 70A-1 and 70A-2 (e.g., family members such as father and mother) can use the gateway 30A, the terminals 50A-a and 50A-b and the mobile terminal 50A-m that are all subordinate to the gateway 30A, as well as the special terminal 50S-a that is subordinate to the special gateway 30S. While the subordinate terminals 50A-a, 50A-b, etc. of the gateway 30A are used, data and information are all passed through the gateway 30A. So, the users are not required to use their IDs particularly. While the mobile terminal 50A-m that is not subordinate to the gateway 30A, the special terminal 50S-a that is subordinate to the special gateway 30S, etc., however, the users are required to use their IDs, passwords, etc. to access this content control system, since data and information are not passed through the gateway 30A. In FIG. 6, 70A-1 and 70A-2 are set as user IDs so as to correspond to the setting of gateway ID 1821=30A respectively, but any of the users who do not access this content control system from a mobile terminal, a special terminal, etc. is not required to use his/her ID specially.

The contents used in this second embodiment are the same as those in the first embodiment, so they will also be described with reference to FIG. 11.

Next, there will be described the sequences carried out in this second embodiment.

Figure 28:
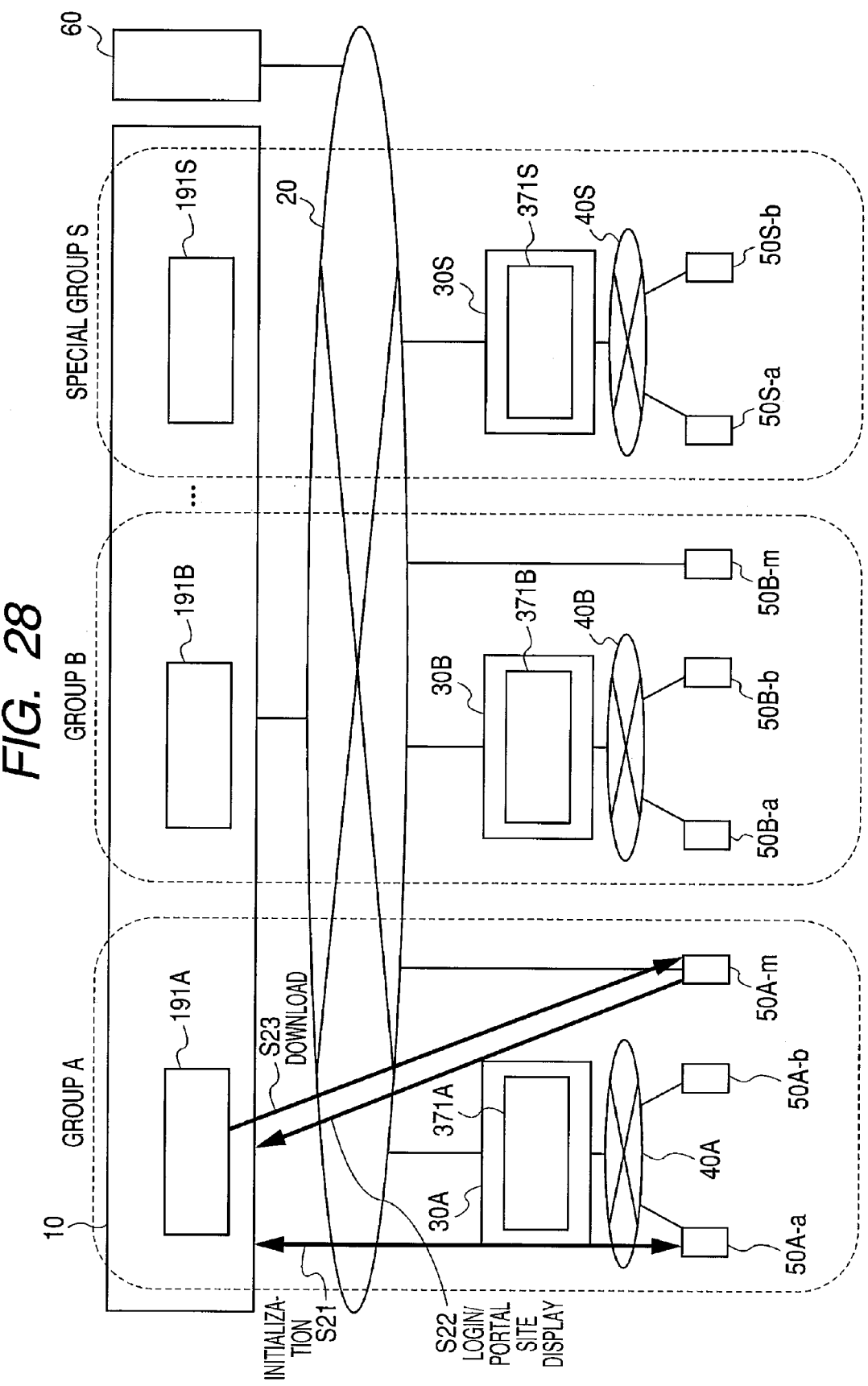
FIG. 28 is a diagram for describing the sequences carried out in the second embodiment.

FIG. 28 is a diagram for describing how those sequences are used in this second embodiment; the sequences are an initialization sequence S21, a login/portal site display sequence S22, and a download sequence S23.

At first, the initialization sequence S21 will be described. In this sequence S21, each user, when accessing the content control system from a mobile terminal, a special terminal, or the like, is required to input his/her ID beforehand to the content control server 10 through the terminal 50. Concretely, the user 70A-1 is required to input 70A-1 as the user ID (as well as the password at the same time) using the user ID setting button on the portal site display screen of, for example, the terminal 50A-a when making a portal site access to the content control server 10 through the terminal 50A-a that is subordinate to the gateway 30A just like in the portal site display sequence S12. In this case, the access is made through the gateway 30A, so the content control server 10 can relate the setting of gateway ID=30A to the setting of user ID=70A-1. Concretely, the content control server 10 sets 30A in the gateway ID entry 1821 in the gateway-user correspondence list (table 2) 182 shown in FIG. 6. In addition to the setting, a service is premised here so as to control the delivery of user contents in each group separately. In this case, the service provider is required to set the user ID by any reliable means, for example, by mail or the like. The user ID is assigned beforehand to the user 70A-1 who has become a member of the service.

Next, there will be described the login/portal site display sequence S22. In this sequence S22 shown in FIG. 28, the user 70A-1 accesses the content control server 10 through the mobile terminal 50A-m that is not subordinate to the gateway 30A. For example, if the user 70A-1 selects a URL using the web browser bookmark from the mobile terminal 50A-m to issue a login request, the content control server 10 accepts the login and sends back the response (portal site display) to the mobile terminal 50A-m, thereby the portal site comes to be displayed on the mobile terminal browser screen.

Figure 16:
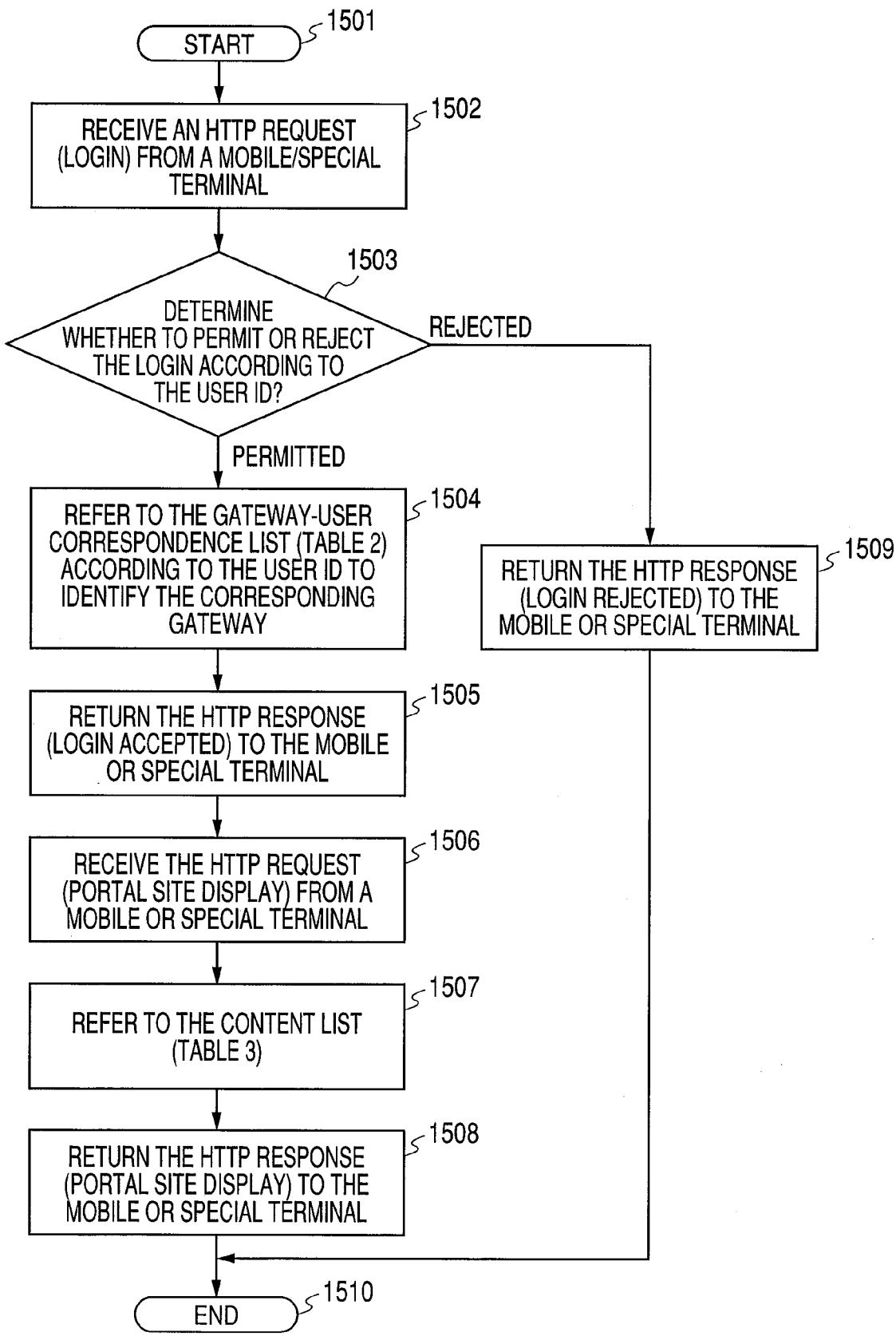
FIG. 16 is a flowchart of the processings of the content control server in a login/portal site display sequence carried out in response to a request from a mobile terminal/special terminal.

FIG. 16 is a flowchart of the processings of the content control server 10 carried out in the login/portal site display sequence S22. In this sequence S22, at first the content control server 10 receives an HTTP request (login) from the mobile terminal 50A-m (1502), then the login/portal processing unit 12 determines whether to permit/reject the login request according to the user ID and the password (1503). The login/portal processing unit 12, when permitting the login, refers to the gateway-user correspondence list (table 2) 182 according to the setting in the table 2 (user ID 1822=70A-1) and identify the corresponding gateway (ID 1821=30A) (1504), then sends back the HTTP response to the mobile terminal 50A-m

(1505). After this, the login/portal processing unit 12, upon receiving another HTTP request (portal site display) from the mobile terminal 50A-m (1506), regards the access to be similar to that from a subordinate terminal of the gateway 30A, since the corresponding gateway (ID=30A) is already identified. Thus the login/portal processing unit 12 refers to the content list (table 3) (1507) and sends back the HTTP response (portal site display) to the mobile terminal 50A-m just like in the login/portal site display sequence S12 in the first embodiment (1508), then exits the sequence S22.

Next, the download sequence S23 will be described. In this download sequence S23 shown in FIG. 28, the content-X that is uploaded into the memory area 191A of the group A in the upload sequence S13 in the first embodiment is downloaded to the mobile terminal 50A-m.

If the login/portal site display sequence S22 is terminated, it means that the corresponding gateway ID=30A is already identified. Thus the flowchart of the processings by the content control server 10 with respect to the download to the mobile terminal 50A-m is almost the same as the flowchart of the processings by the content control server 10 with respect to the download from the subordinate terminal of the gateway shown in FIG. 14 if the gateway is replaced with the mobile terminal. The detailed description for the download sequence S23 will therefore be omitted here. Similarly, the detailed description for the upload and copy processings will also be omitted here.

And as described in the first embodiment, because the corresponding gateway (ID=30B) can be identified similarly to the case described above, the user 70B-1 comes to be able to access the content control server 10 through the mobile terminal 50B-m that is not subordinate to the gateway 30B with respect to the content X that is copied in the memory area 191B of the group B from the memory area 191A of the group A in the content control server 10 and downloads the content X to the mobile terminal 50B-m. If the user 70C-1 corresponding to the gateway 70C wants to access the content control server 10 from the mobile terminal 70C-m, the number of delivery destinations of the content X can be limited.

The detailed similar operations will be described later in the fifth embodiment. Here, just like the mobile terminal, the corresponding gateway ID can be identified in the similar way even in accesses from any special terminal that is subordinate to a special gateway. Accesses can thus be controlled.

As described above, due to the correspondence between the gateway ID and the user ID, the mobile terminal and the special terminal can access the content control server 10 using the gateway ID as an access key just like each terminal that is subordinate to the gateway, thereby the system can limit the number of content delivery destinations. This completes the description for the sequences carried out in this second embodiment shown in FIG. 28.

Next, there will be described the third embodiment of the present invention with respect to how contents are delivered from a gateway to another gateway and how the delivery destinations of the contents are controlled. The content control server 10 and the gateway 30 employed in this third embodiment are the same as those in the first embodiment, so they will also be described with reference to FIGS. 2 and 3. In addition to the system components in the first embodiment shown in FIG. 2, a delivery processing unit 16 is added in the second embodiment. And the delivery processing unit 16, upon receiving a content from a gateway 30 or a terminal 50, transfers the content to another gateway 30. In addition to the server components shown in FIG. 3 in the first embodiment, a delivery processing unit 35 is newly added in this third embodiment. The delivery processing unit 35 sends contents to each delivery source gateway and receives contents from each delivery destination gateway 30.

The tables used in this third embodiment are the same as those in the first embodiment. The contents used in the second embodiment are also the same as those in the first embodiment, so they will also be described with reference to FIG. 11.

Figure 29:
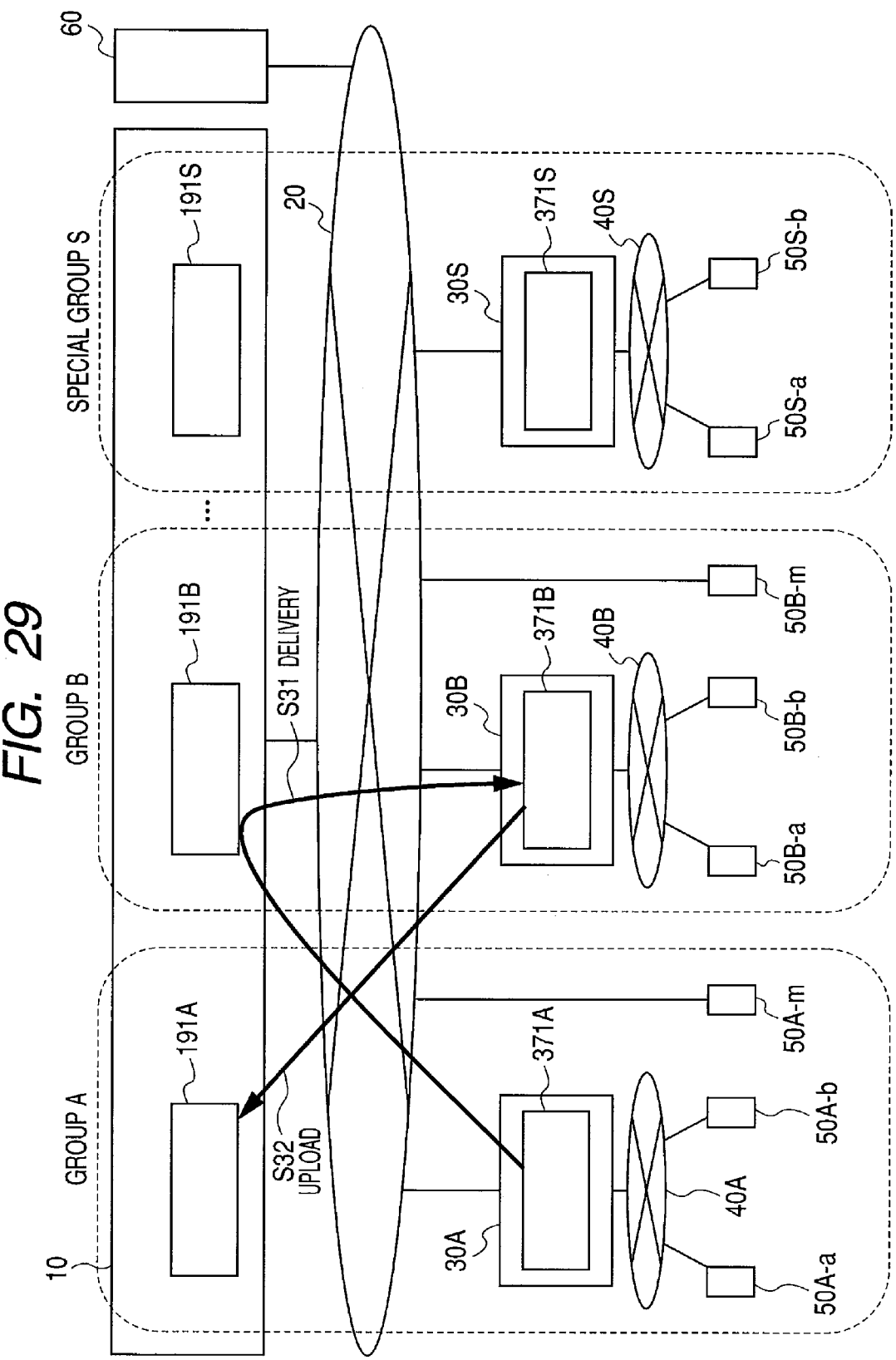
FIG. 29 is a diagram for describing the sequences carried out in the third embodiment.

Next, there will be described the sequences carried out in this third embodiment. FIG. 29 is a diagram for describing how those sequences are carried out in this third embodiment. Those sequences are a delivery sequence S31 and an upload sequence S32.

At first, the delivery sequence S31 will be described. In this delivery sequence S31 shown in FIG. 29, the user 70A-1 accesses the content control server 10 from his/her terminal 50A-a that is subordinate to the gateway 30A to deliver a content to another gateway 30B. Concretely, for example, the user 70A-1 sends a login/portal site display request to the content control server 10 from his/her terminal 50A-1 (e.g., a net TV terminal), then requests the server 10 for the delivery of a user content Y stored in the terminal 50A-a (e.g., a video file generated by a video camera) to the gateway 30B using the DELIVER button on the portal site display screen. The destination gateway 30A then sends the content Y to the content control server 10 and the content control server 10 transfers the content Y to the destination gateway 30B. The processings of the gateway 30A in the delivery sequence S31 are almost the same as those of the flowchart shown in FIG. 22 in the first embodiment, so detailed descriptions for the processings will be omitted here. In this third embodiment, however, instead of the upload processing unit 33 shown in FIG. 3, the delivery processing unit 35 carries out those delivery processings.

Figure 17:
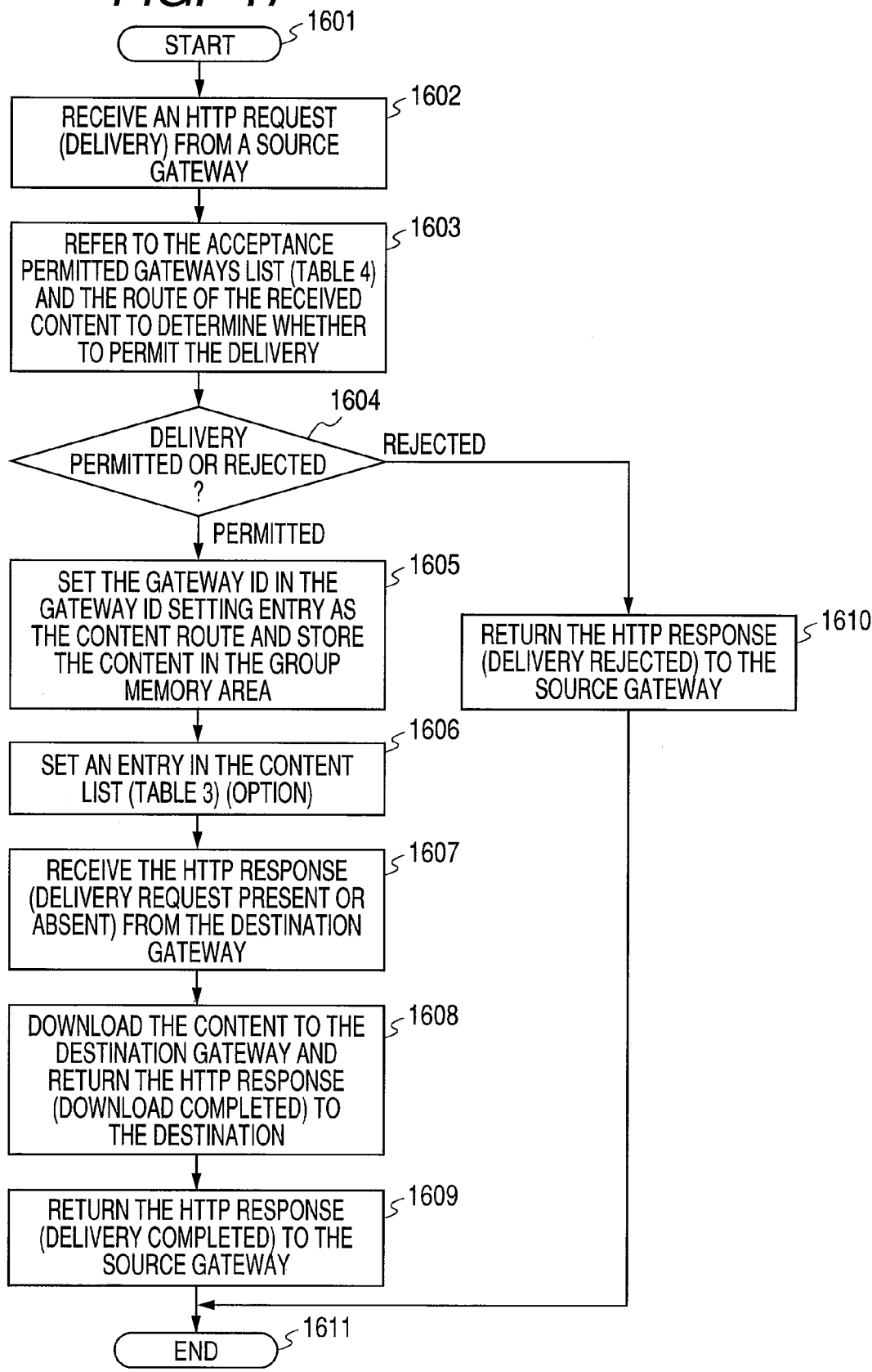
FIG. 17 is a flowchart of the processings of the content control server in a delivery sequence.

FIG. 17 is a flowchart of the processings of the content control server 10 in the delivery sequence S31. In this sequence S31, the delivery processing unit 16 provided in the content control server 10 refers to the acceptance permitted gateways list (table 4) and the route of the received content Y to determine whether to permit/reject the delivery request (1603). Here, as shown in FIG. 8, if 30A is set as an entry of the acceptance-permitted gateway ID 1842 in the acceptance permitted gateways list (table 4) 184 with respect to the setting of gateway ID 1841=30B, the delivery is permitted for the acceptance permitted gateways list (table 4). However, because no route is set for the content Y (no entry is set for the gateway ID setting 821) here, the delivery is also permitted for the route of the content Y. Consequently, the delivery processing unit 16 sets "permitted" for the setting of whether to permit/reject the delivery (1604). The delivery processing unit 16 then sets the gateway ID in the gateway ID setting entry 821 (1605). Here, because the content Y is to be delivered from the gateway 30A to the gateway 30B, the delivery processing unit 16 sets the first route "30A" in the gateway ID setting entry 8211 and the second route "30B" in the gateway ID setting entry 8212. The delivery processing unit 16 also stores the content Y in the memory area 191B of the group B in the content storage unit 19 shown in FIG. 2. In this case, the delivery processing unit 16 sets the entry in the content list (table 3) (1606). This step 1606 is effective to improve the convenience for the user 70B-1.

After this, the delivery processing unit 16 of the content control server 10 receives the HTTP response (delivery request present/absent) from the destination gateway 30B (1607), downloads the content Y to the destination gateway 30B, returns the HTTP responses (download completed) (1608) and (delivery completed) (1609) to the source gateway 30A to terminate the processing. The processings in steps from 1607 to 1608 are for a pseudo push processing carried out by polling from the destination gateway 30B; however, the push processing may be carried out by the server 10.

Figure 24:
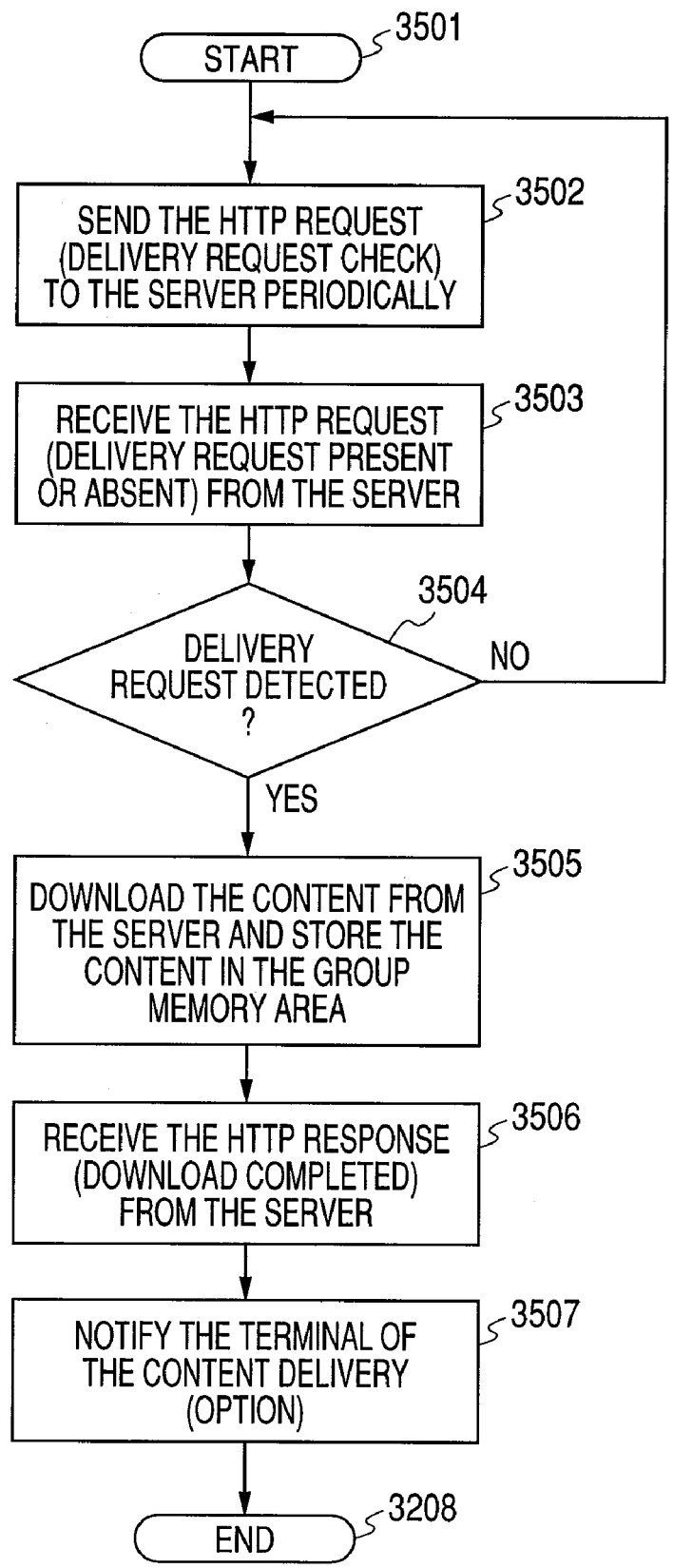
FIG. 24 is a flowchart of the processings of a delivery destination gateway in a delivery sequence.

FIG. 24 is a flowchart of the processings by the destination gateway 30B carried out in the delivery sequence S31. As described above, here, the destination gateway 30B carries out a pseudo push processing by means of polling, so the delivery processing unit 35 repeats the processings in steps from 3502 to 3504 periodically to check the presence/absence of a delivery request. If a delivery request is detected, the delivery processing unit 35 downloads the content Y from the content control server 10 and stores the content Y in the memory area 371B of the group B in the content storage unit 38 shown in FIG. 3 (3505), then receives the HTTP response (3506). At this time, the delivery processing unit 35 may notify the content delivery to the object terminal, mobile terminal, etc. that are subordinate to the gateway 30B so as to notify the user of the content delivery (3507). After the terminal connection is detected, the user is permitted to use the delivered content Y.

As described above, the use of such gateway IDs comes to enable contents to be delivered through gateways and those gateways to receive delivered contents even while terminals that are subordinate to those gateways are not powered nor connected to a network. As a result, it comes to enable contents to be stored in local group memory areas.

Next, the upload sequence S32 will be described. In this sequence S32 shown in FIG. 29, the user 70B-1 of the terminal 50B-a that is subordinate to the gateway 30B accesses the content control server 10 to upload the content Y already delivered to the gateway 30B to the memory area 191A of another group A. For example, this sequence S32 is useful when the source user 70A-1 loses the content Y and the content control server 10 cannot find the content Y, so that the user 70A-1 makes an attempt to obtain the content Y from the destination user 70B-1.

Figure 22:
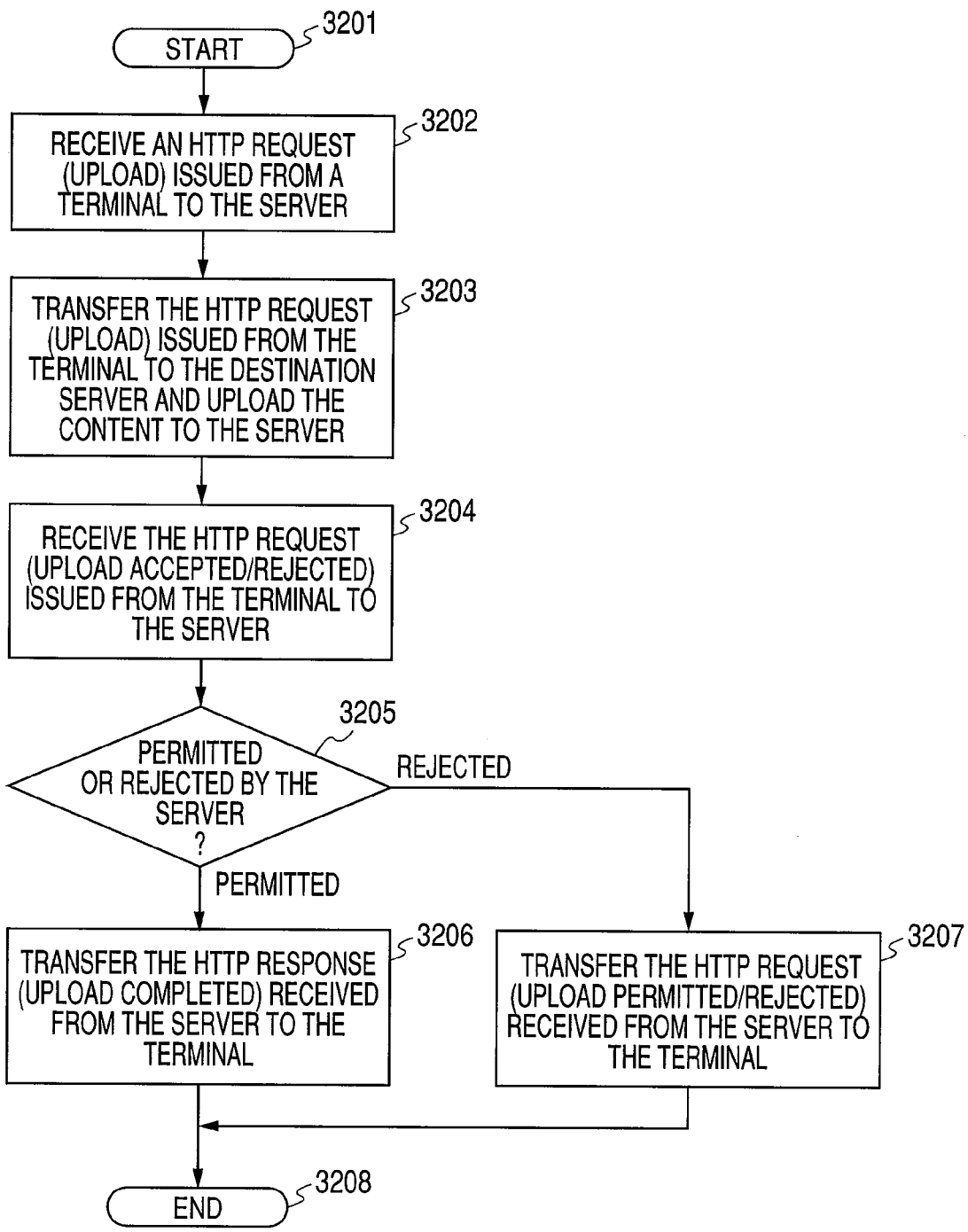
FIG. 22 is a flowchart of the processings of the gateway in an upload sequence.

The processings of the gateway 30B in the upload sequence S32 are almost the same as those shown in FIG. 22 in the first embodiment except for the processing in step 3203, which is slightly different from that in the first embodiment. In the first embodiment, the subject user uploads the content existing in the terminal 50A-a to the content control server 10. In this third embodiment, however, the user uploads the contents existing in the gateway 30B to the content control server 10. All the other processings in this sequence are the same between the first and third embodiments.

The processings of the content control server 10 in the upload sequence S32 are the same as those shown in FIG. 13 in the first embodiment. Here, if the user 70B-1 of the terminal 50B-a that is subordinate to the gateway 30B wants to upload the content Y already delivered to the gateway 30B to the memory area of the group C in the content control server 10, the copy is not permitted even when "acceptable" is set in the acceptance permitted gateways list (table 4). This is because the upper limit number of passed groups, which is 2, is already set in the gateway ID setting entry 821 as the routes of the content Y. In such a way, the content control system of the present invention can limit the number of delivery destinations even at the delivery time.

The details of other similar processings will be described in the fifth embodiment. Just like a terminal that is subordinate to a gateway, the same method can be used to control the delivery and after-delivery processings from a mobile terminal to a gateway and from a terminal that is subordinate to the gateway to a special gateway.

This completes the description for the sequences in the third embodiment shown in FIG. 29.

Next, the fourth embodiment of the present invention will be described. The fourth embodiment is effective to identify a user through whom a content is drained out of the content control system.

The content control server 10 and the gateway 30 employed in this fourth embodiment are the same as those in the first embodiment, so they will also be described with reference to FIGS. 2 and 3. In this fourth embodiment, a route processing unit 17 is added to the server shown in FIG. 2 in the first embodiment. The route processing unit 17, upon receiving an inquiry about a content drained out from the gateway 30, returns the response. Among the gateway components shown in FIG. 3 in the first embodiment is included a route processing unit 36. This route processing unit 36 also inquires such a content-drained-out route to the content control server 10.

The tables used in this fourth embodiment are the same as those in the first embodiment. The content used in this fourth embodiment is also the same as that in the first embodiment, so they will also be described with reference to FIG. 11.

Although no sequence chart is shown in this fourth embodiment, it is premised here that the sequence chart is continued on from that in the first embodiment; the user 70B-1 of the terminal 50B-a that is subordinate to the gateway 30B downloads the content X existing in the memory area 191A of the group A to the terminal 50B-a, then the content X is drained out of the content control system for some unknown reason (e.g., the content X is saved in a memory card and brought out, uploaded to an Internet server, etc.) while the user 70A-1 finds the drain-out.

Here, it is premised that after the content X is drained out of the content control system, it is kept circulated outside the system, then the user 70A-1 gets it in some place by happing (e.g., while the content X is uploaded to a web site). In this case, the user 70A-1 can inquire the routes of the content X from the content control server 10. Here, the flowchart of the processings by the gateway 30A is omitted.

Figure 18:
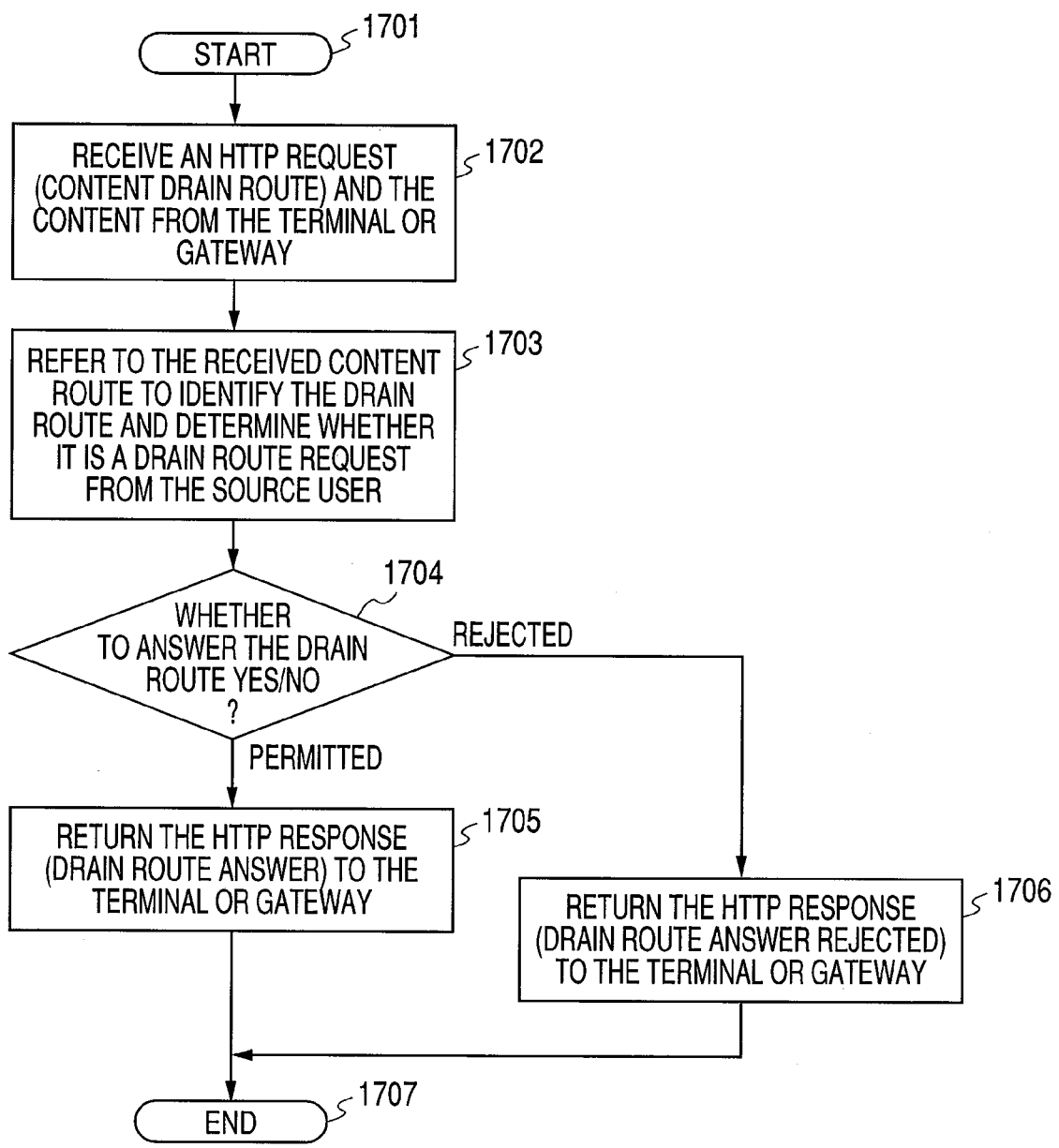
FIG. 18 is a flowchart of the processings of the content control server in a drain-out route inquiry sequence.

FIG. 18 is a flowchart of the processings by the content control server 10 carried out in response to a user's inquiry about the routes of the content X drained out of the system.

As shown in FIG. 18, the content control server 10, upon receiving an HTTP request (drain-out route inquiry) from the gateway 30A, also receives the content X together with the request (1702). Then, the route processing unit 17 refers to the route of the received content X (set in the gateway ID setting entry 821 of the content X) to identify the drain-out route and determines whether or not the request is issued from the content source user (1703). As described in the first embodiment, each content route has a gateway ID set in the gateway ID setting entry 821 with use of digital watermarking, meta information, or the like. This is why the route processing unit 17 can identify each route through which each subject content is passed (a route from the group A to the group B in this case). Also in this case, because the request is issued from the content source user 70A-1, the route processing unit 17 specifies whether to answer the drain route (1704) as YES and returns the HTTP response (answer the drain-out route) to the gateway 30A, thereby the user 70A-1 can know the drain route through the gateway 30A.

Here, even if another user 70C-1 obtains the content X, the name of the content owner is hidden from users, since the gateway ID is encoded, for example, as described in the first embodiment. And even if the user 70C-1 inquires the drain-out route of the content X, the user 70C-1 is not regarded as the content source user. The name of the content owner can thus be closely guarded.

Furthermore, even when the user 70A-1 cannot obtain the content X by happening as described above, for example, if another user 70C-1 attempts to upload the obtained content X to the content control server 10, the processings will be as shown in steps 1208 and 1209 shown in FIG. 13. Concretely, the content control server 10 returns the HTTP response to the upload request source gateway server to reject the upload (1208). The content control server 10 then notifies the gateway 30A or the terminal of the user 70A-1 of the rejection (1209). If the content X is found to be a drained-out one at the time of rejection, the drain-out route can also be notified to the content source user.

As described above, if the gateway ID is set in the gateway ID setting entry 821 of the content X, which is an entry denoting the content route, the user who has passed the content can be identified while the name of the content owner is kept hidden. This is effective to send out a warning message to each user who has drained a content out of the system by mistake and even to each user who has drained out a content illegally, of course.

Next, the fifth embodiment of the present invention will be described with respect to how to deliver such information as an advertisement according to the attribute set in the content. The content control server 10 and the gateway 30 employed in this fifth embodiment are the same as those in the first embodiment, so they will also be described here with reference to FIGS. 2 and 3. The content control system in this fifth embodiment further includes an information server 60.

Figure 4:
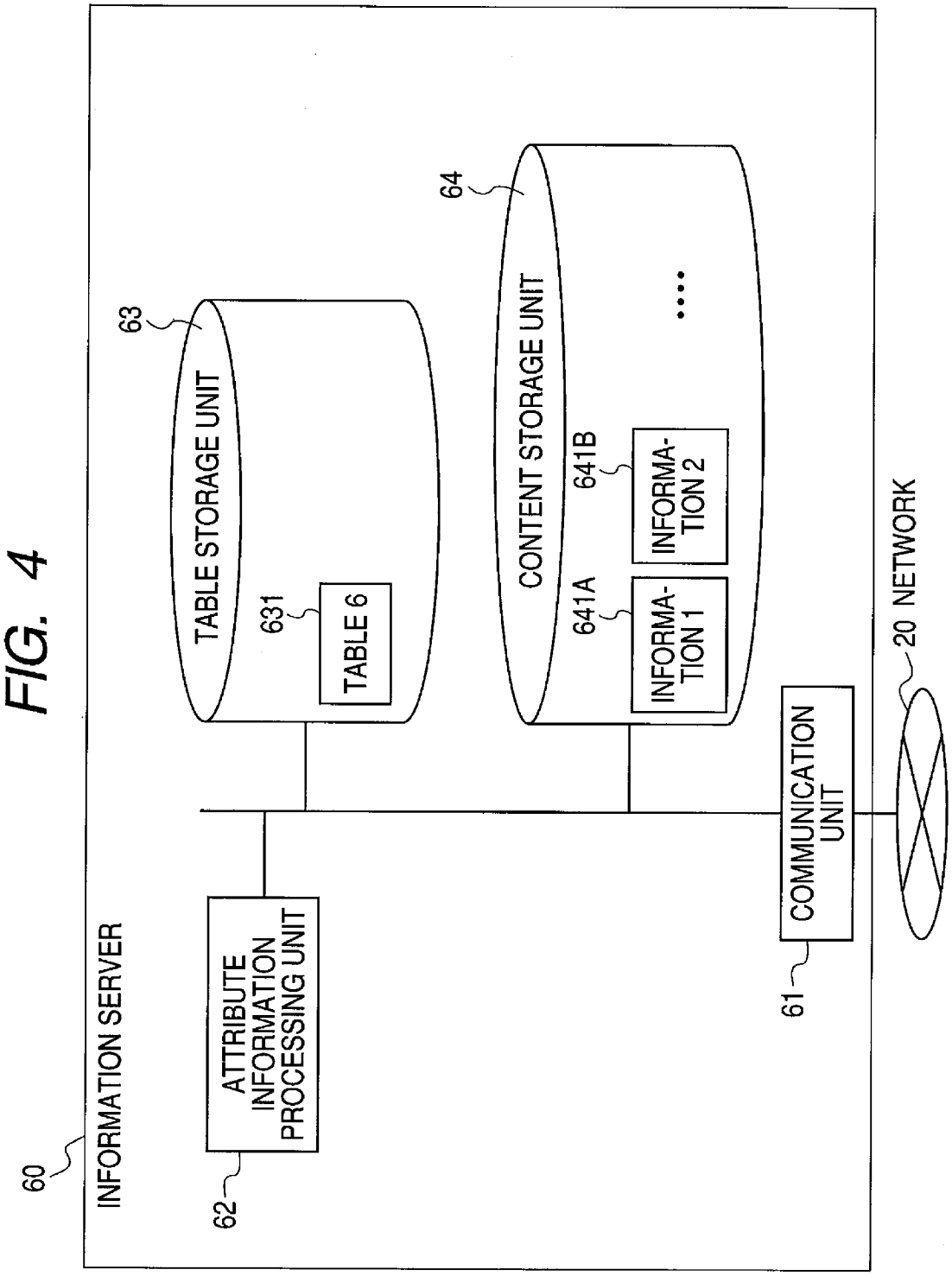
FIG. 4 is a block diagram of an information server.

FIG. 4 is a block diagram of the information server 60. The information server 60 includes a communication unit 61 that functions as an interface with a network 20, an attribute information processing unit 62, a table storage unit that stores table data, and a content storage unit 64 that stores contents as data.

Among the server components shown in FIG. 4, the communication unit 62 exchanges massages with the content control server 10 connected through the network 20 and passes processings to the processing units according to the message contents respectively. The communication unit 62 receives such attribute information as positional information from the content control server 10 and sends back related information, advertisements, etc. to the content control server 10. The table storage unit 63 also stores various types of tables as data. The content storage unit 64 also stores information contents as data.

The tables used in this fifth embodiment are the same as those used in the first and second embodiments except for tables 5 and 6 that are newly added to this fifth embodiment. The table 5 is stored in the table storage unit 18 of the content control server 10 as shown in FIG. 2 and the table 6 is stored in the table storage unit 63 of the information server 60 as shown in FIG. 4.

FIG. 9 is a gateway-user-attribute correspondence list 185 (table 5). The list 186 (table 5) is the same as the gateway-user correspondence list (table 2) shown in FIG. 6 in the second embodiment except for the positional information entry 1853, which is newly added to the table 5.

FIG. 10 is an attribute-information correspondence list 631 (table 6). This list 631 denotes a correspondence, for example, among the entries of location 6311, time band 6312, and information ID 6313 related to the location/time band 6312. As shown in FIG. 10, for example, related information, advertisements, etc. are set beforehand for the information ID 6313 corresponding to each district such as Yokohama, Tokyo, Kawasaki, etc. and corresponding to each time band (e.g., AM, PM, etc.). The related information and advertisements are, for example, a weather forecast in a district, news, an entertainment program, shop information, etc.

The contents used in this fifth embodiment are the same as those in the first embodiment, so they will also be described with reference to FIG. 11.

Next, there will be described the sequences carried out in this fifth embodiment. FIG. 30 is a diagram for describing how those sequences are carried out in this fifth embodiment. The sequences are an initialization sequence S51, a delivery sequence S52, a login/portal site display sequence S53, and a download sequence S54.

At first, the initialization sequence S51 will be described below. In this sequence S51, just like that in the first embodiment, each subject gateway ID is initialized between each gateway 50 and the content control server 10. At this time, in addition to the setting of the subject gateway ID, the location of the gateway is also registered as the attribute information specific to the gateway in the content control server 10 beforehand. Here, note that the registration is made in the gateway-user-attribute correspondence list (table 5), not in the gateway-user correspondence table list (table 2) shown in FIG. 6. As to be described in the delivery sequence S52, it is premised here that the user 70A-1 of the terminal 50A-a that is subordinate to the gateway 30A accesses the content control server 10 to deliver the object content to the special gateway 30S. For example, if the user 70A-1 lives in Yokohama and works in a print shop in Kawasaki, which is near Yokohama, the gateway 30A is required to have its own home entry separately from those of the users 70A-1, 70A-2, etc. with respect to the setting of gateway ID 1851=30A and Yokohama is set in the positional information entry 1853. Similarly, Kawasaki is set as an entry of the special gateway 30S in the positional information 1853.

Next, the delivery sequence S52 will be described. In this sequence S52 shown in FIG. 30, the user 70A-1 of the terminal 50A-a that is subordinate to the gateway 30A accesses the content control server 10 to deliver a content to the special gateway 30S. This delivery sequence S52 is almost the same as the delivery sequence S31 in the third embodiment except for the delivery destination; the content is delivered from the gateway 30B to the special gateway 30S in this fifth embodiment. As shown in the acceptance permitted gateways list (table 4), an asterisk "*" (any) is set as an entry of the acceptance permitted gate ID 1842 for the special gateway having the setting of gateway ID=30S. Therefore, unlike other type gateways, the gateway accepts contents from any gateways joining the services supplied from the content control system.

Next, there will be described the login/portal site display sequence S53. In this sequence S53 as shown in FIG. 30, at first, the user 70A-1 carries out a login/portal site display operation from the special terminal 50A-a that is subordinate to the special gateway 30S. Then, the subject server delivers required information/advertisements, etc. to the destination according to the attribute. For example, if the user 70A-1 of the special terminal 50S-a issues a login request to the content control server 10 through the special gateway 30S, the special gateway 30S passes the login request to the content control server 10 and the content control server 10 accepts the login request and sends back the related information stored in the information server 60 and a portal site display request to the special terminal 50S-a through the special gateway 30S, thereby the portal site and its related information come to be displayed on the browser screen of the special terminal 50S-a.

Figure 25:
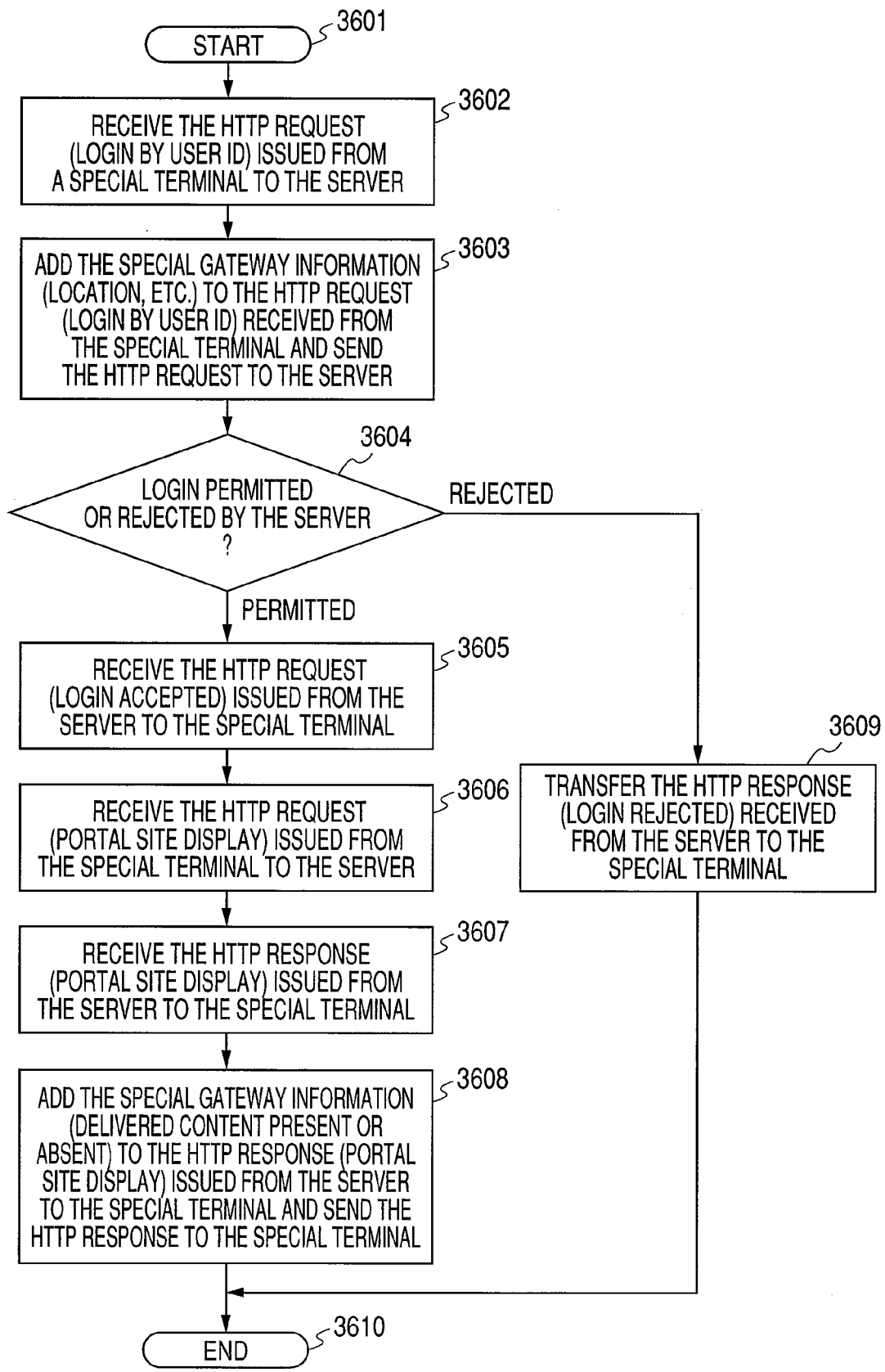
FIG. 25 is a flowchart of the processings of the gateway in a login/portal site display sequence carried out in response to a request from a special terminal.

Next, there will be described the processings by the special gateway 30S in the login/portal site display sequence S53 with reference to the flowchart shown in FIG. 25. In this sequence S53, the special gateway 30S receives an HTTP request (login with a user ID) (3602) from the special terminal 50S-a and the login/portal processing unit 32 adds the attribute information (location, etc.) of the special gateway 30S to the request and transfers the request to the content control server 10 (3603). If the login is completed, the login/portal processing unit 32 carries out a portal site display processing and finally adds the information (delivered content presence/absence, etc.) existing in the special gateway 30S to the HTTP response (portal site display) received from the content control server 10, then sends the response to the special terminal 50S-a (3608).

Figure 19:
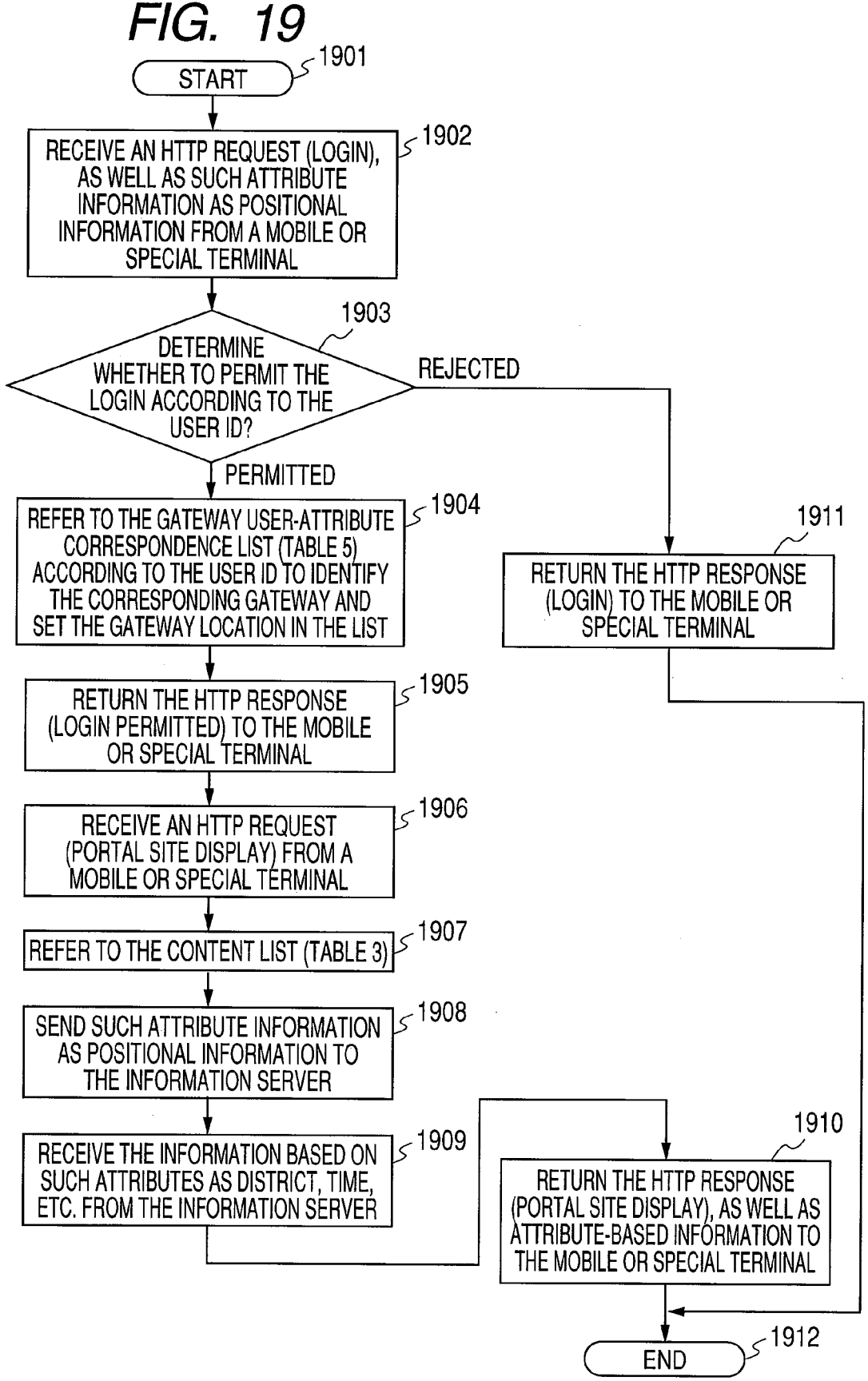
FIG. 19 is a flowchart of the processings of the content control server in a login/portal site display sequence with respect to attribute information delivery.

Next, there will be described the processings of the content control server 10 in the login/portal site display sequence S53 with reference to the flowchart of the processings by the content control server 10 with respect to the attribute information delivery in the login/portal site display processing shown in FIG. 19. In FIG. 19, a step of attribute information delivery is added to the flowchart of the processings by the content control server 10 with respect to a login/portal site display request issued from a mobile terminal/special terminal shown in FIG. 16 in the second embodiment.

Upon receiving the HTTP request (login/portal site display) from the special terminal 50S-a, the content control server 10 also receives such attribute information as positional information together (1902). After logging in, the login/portal processing unit 12 refers to the previously set gateway-user-attribute correspondence list (table 5) 185 shown in FIG. 9 according to the set information of user ID 1852=70A-1 to identify the corresponding gateway (ID 1851=30A) and sets positional information 1853=Kawasaki in the list (1904). Here, Kawasaki, which denotes the location of the special gateway 30A, is set, but if a mobile terminal is used for the login in Tokyo, positional information=Tokyo is set. The positional information may be replaced with latitude/longitude information of a GPS (Global Positioning System). After this, the login/portal processing unit 12 carries out portal site display for the special terminal 50S-a and sends such attribute information as positional information to the information server 60 (1908). Then, the login/portal processing unit 12, when receiving information related to such attribute informationas location, time, etc. from the information server 60 (1909), sends attribute related information together with the HTTP response (portal site display) to the special terminal 50S-a (1910). Here, Kawasaki and Yokohama are used as positional information, since both of Kawasaki where both the user 70A-1 and the special gateway 30S exist and Yokohama that is the hometown of the user 70A-1 can be used to obtain effective information/advertisements respectively. Thus both Kawasaki and Yokohama are used as positional information items here.

Figure 20:
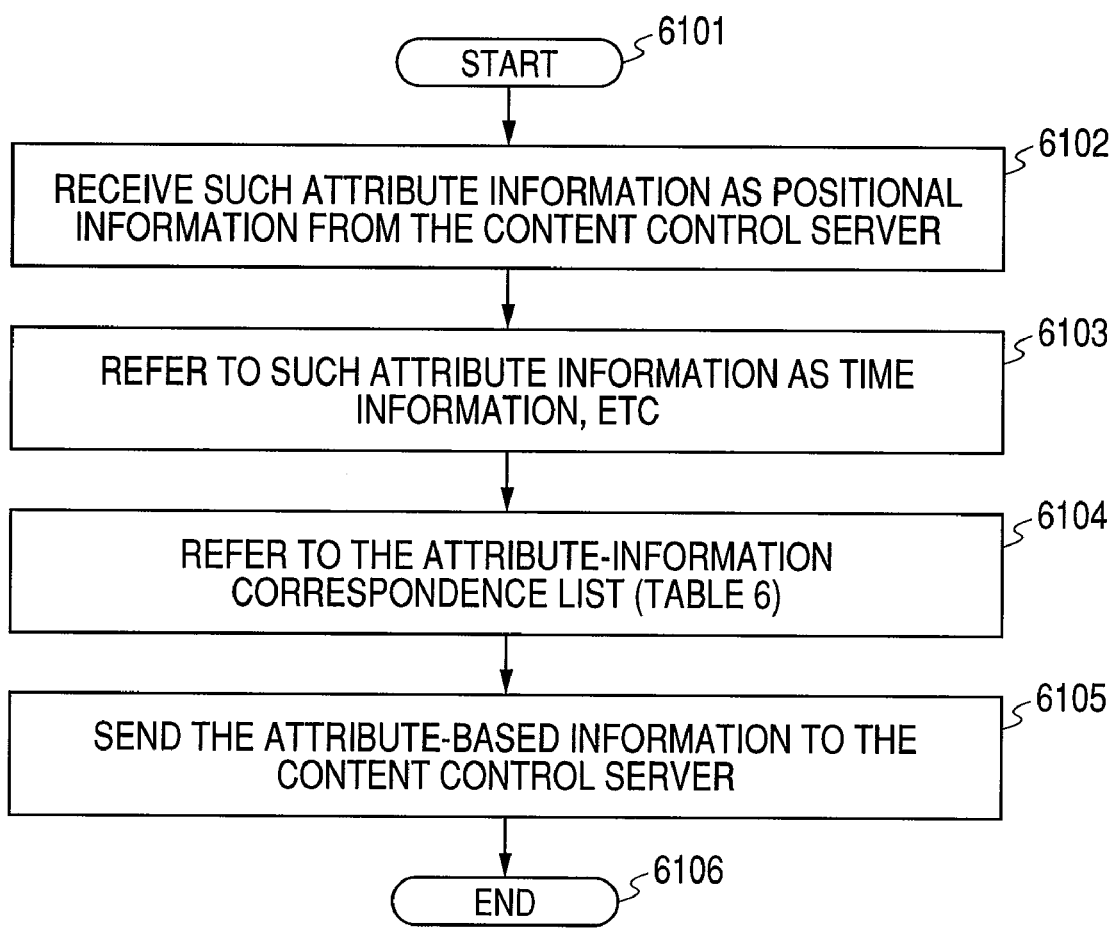
FIG. 20 is a flowchart of the processings of the information server in a login/portal site display sequence with respect to attribute information delivery.

FIG. 20 is a flowchart of the processings by the information server 60 in the login/portal site display sequence S53. Hereunder, the sequence S53 will be described with reference to FIGS. 4 and 20. If the information server 60 receives such attribute information as positional one from the content control server 10 (6102), the attribute information processing unit 62 refers to such attribute information as time information (6103), as well as to the attribute-information correspondence list 631 (table 6) stored in the table storage unit 63 (6104). As described in FIG. 10, the list 631 includes related information, advertisements, etc. set beforehand in the entries of the information ID 6313 for each district such as Yokohama, Tokyo, and Kawasaki, and for each time band (AM, PM, etc.). Thus the attribute information processing unit 62 refers to the attribute-information correspondence list (table 6) according to such attribute information as positional one received from the content control server 10 and by taking consideration to, for example, the time band, then sends the related information, advertisements, etc. to the content control server 10 (6105). For example, if it is expected that a content is delivered in the morning from the user's home in Yokohama to a special gateway in Kawasaki and the content is accessed from the special terminal in the afternoon, it is possible to send the information related to the morning in Yokohama and the information related to the afternoon in Kawasaki in the attribute-information correspondence list 631 (table 6) shown in FIG. 10 separately. And such afternoon-related information may also be sent to the user's home in Yokohama if it is expected that the user might arrive at home in the afternoon. In this case, it is not required that such attribute information as positional one received from the content control server 10 might not match completely with the positional information 6311 in the attribute-information correspondence list (table 6) 631. The positional information may be information of a nearby position and if a GPS is used to obtain such positional information, the positional information may be that of an area that includes the latitude/longitude.

Next, the download sequence S54 will be described. In this sequence S54, the user 70A-1 of the special terminal 50B-a that is subordinate to the special gateway 30S downloads/uses the content delivered to the special gateway 30S and delivers information/advertisements according to the attribute information of the downloaded content.

Figure 26:
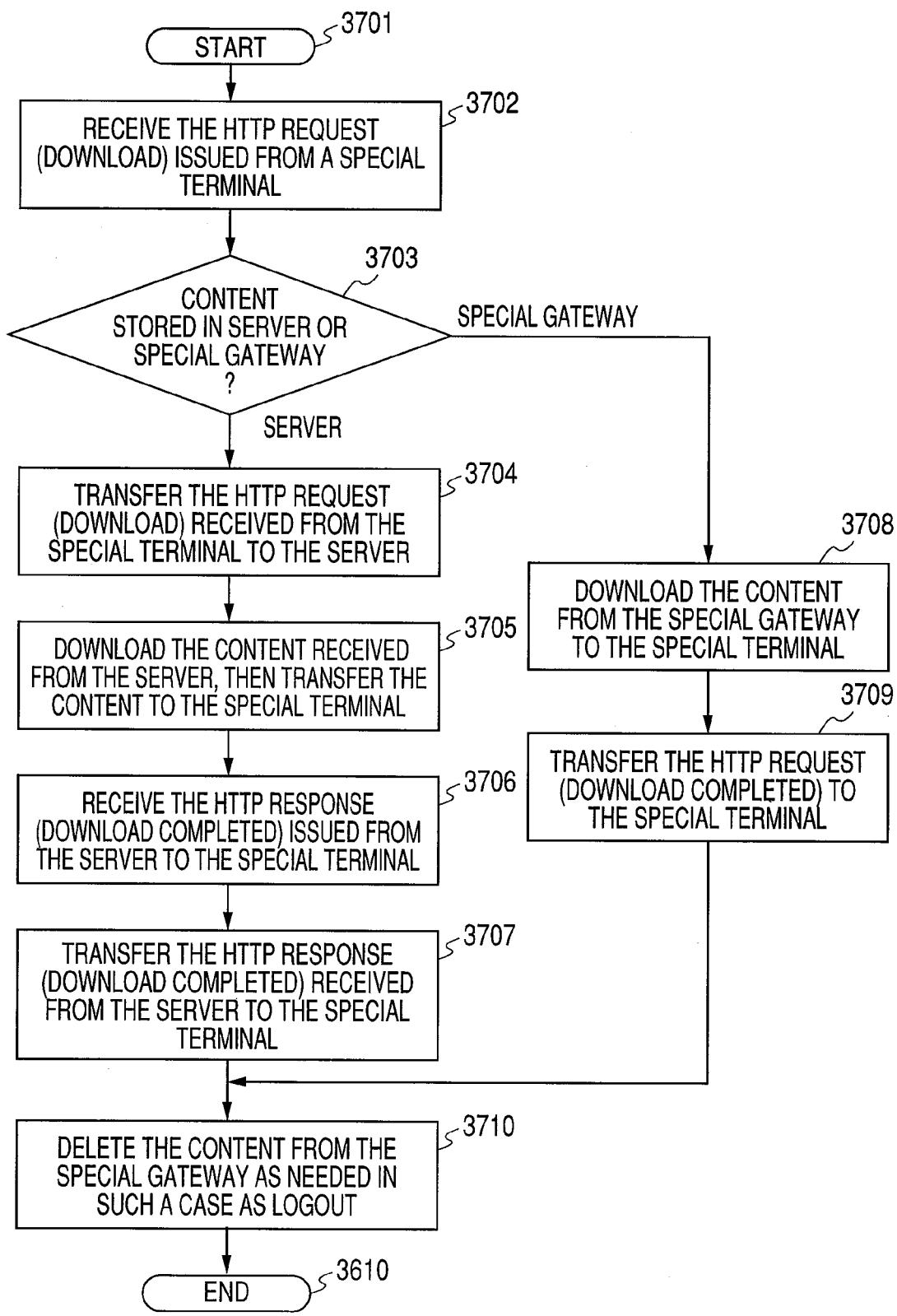
FIG. 26 is a flowchart of the processings of the gateway in a download sequence with respect to a special terminal.

FIG. 26 is a flowchart of the processings by the special gateway 30S in the download sequence S54. The download is made to a special terminal in this case. The flowchart shown in FIG. 26 is continued from the step 3610 in the flowchart shown in FIG. 25, which is described in the login/portal site display sequence S53. In this sequence S54, the special gateway 30S receives an HTTP request (download) from the special terminal 50S-a (3702). Here, in step 3608 in the sequence S53 shown in FIG. 25, it is premised that the content is already delivered to the special gateway 30S. Thus the download processing unit 14 determines that the content exists in the special gateway 30S (3703) and enables the content to be downloaded from the special gateway 30S to the special terminal 50S-a (3708). Also in this case, just like in the login/portal site display sequence S53, the content and its related information/advertisements, etc. are downloaded together. As a result, the user 70A-1 comes to be able to view, listen to, print out, and take out not only the content, but also its related information and advertisements back home. Finally, at the time of logging out, the login/portal processing unit 12 deletes the content as needed from the special gateway 30S (3710). And because the special terminal 50S-a is also used by other users, the contents downloaded to the terminal 50S-a should also be deleted together.

In the embodiments described above, positional information is set as attribute information in the special gateway 30S. The attribute information may also include other information such as user information of the subject special terminal that is subordinate to the special gateway 30S. And when delivering contents from the mobile terminal 50A-m to the gateway 30A at the user's home instead of the delivery from the terminal 50A-a to the special gateway 30S, the content-related information and advertisements can be delivered to the place where the family who are interested in those information items exits.

According to the embodiments described above, in one aspect, the present invention can provide a content control system connected to plural mobile terminals that are not subordinate to any gateways and/or a special gateway having a subordinate special terminal usable by any users through a network. Each of the content control servers 10 and the gateways 30 includes a memory area usable by plural users who use one or more terminals that are all subordinate to the gateway, as well as a mobile terminal and a special terminal. The content control server 10 has a table denoting the correspondence between each gateway identifier and each user identifier while the gateway identifier identifies a gateway corresponding to a user who uses contents and each user identifier identifies the user. The content control server 10 assigns such a gateway identifier to each content and sets the upper limit number of groups through which the content is passed, thereby each of the terminals that are subordinate to each gateway, as well as each mobile terminal that is not subordinate to the gateway and each special terminal that is subordinate to each special gateway comes to be able to control the delivery of user contents with respect to the memory area.

In another aspect of the present invention, each mobile terminal that is not subordinate to a gateway and each special terminal that is subordinate to each special gateway comes to be able to control the delivery of user contents in each group separately just like the accesses from each terminal that is subordinate to each gateway as described in the first embodiment.

In still another aspect of the present invention, contents can be delivered from each terminal of each gateway to another gateway. In addition, when the destination gateway receives a content, the content can be held in a local group memory area even when the destination terminal is not kept powered nor connected to the network. Thus just like the terminal, delivery and its post processings can be controlled from a mobile terminal to its host gateway and from a terminal of the gateway to a special gateway similarly.

In still another aspect of the present invention, each content control server includes a device that can recognize the gateway identifier added to each content, thereby the server can identify the user through whom the content is delivered while keeping the name of the content owner secret when the content is drained out of the content control system whether it is by accident or by evil intension.

Furthermore, in still another aspect of the present invention, if any content is drained out of the content control system as described above, each user through whom the content is delivered can be identified while keeping the name of the content owner secret. This function is effective to warn each user about such a drain-out content even when the drain-out is made without any ill intension.

Furthermore, in still another aspect, the present invention provides a content control system connected to an information server through a network. The information server includes a table denoting a correspondence between each gateway attribute information and another information related to the attribute information, thereby the information server can deliver the related information according to the attribute information received from the content control server. This aspect of the present invention makes it possible to deliver/receive attribute related information such as user terminals, gateway positions/locations, advertisements, etc. together with the content to be delivered.

What is claimed is:

1. A content control server comprising:
    a plurality of group identifiers, each being used to identify a group composed of a plurality of users;
    a plurality of memory areas, each of which corresponds to one of the plurality of group identifiers;
    a request accepting unit that accepts an acquisition request for a first content stored in one of the plurality of memory areas; and
    a content delivery processing unit that compares an identifier of a source of the acquisition request with the plurality of group identifiers, if the identifier of the source of the acquisition request matches the group identifier of the one of the plurality of memory areas, permits the delivery of the first content and sends the first content to the source of the acquisition request,
    if the identifier of the source of the acquisition request does not match any of the plurality of group identifiers, determines whether or not a predefined acquisition permission identifier of the source of the first content matches with the identifier of the source of the acquisition request and sends the first content to the acquisition request source if the predefined acquisition permission identifier of the first content matches the identifier of the source of the acquisition request.

2. The content control server according to claim 1, connected to a plurality of gateway servers through the network, the server further comprising:
    a content storage unit that, upon receiving the first content from a first gateway server corresponding to a terminal, stores the first content in the memory area corresponding to the group identifier and adds the first gateway server identifier to the first content.

3. The content control server according to claim 1, wherein the content delivery processing unit, upon sending the first content to the acquisition request source, adds the identifier corresponding to the acquisition request source to the first content.

4. The content control server according to claim 2, wherein the storage unit, upon receiving a second content storing request from a second gateway server so as to store the second content in a memory area corresponding to the group identifier corresponding to the first gateway server, determines whether or not the group identifier is added to the second content and rejects the second content storing request if the second content has been stored in a number of memory areas exceeding a predetermined number.

5. The content control server according to claim 1, wherein the content delivery processing unit, when having a memory area corresponding to the acquisition request source, copies the first content and stores the copy in the memory area corresponding to the acquisition request source.

6. The content control server according to claim 2, wherein the content delivery processing unit relates the group identifier corresponding to the first gateway server to the first content and the identifier of the acquisition request source to the first content, respectively.

7. The content control server according to claim 1, wherein the first content has an identifier storing area that stores the identifier of a first content destination and stops the transfer of the first content to the acquisition request source if the identifier of the acquisition request source cannot be written in the identifier storing area upon sending the first content to the acquisition request source.

8. The content control server according to claim 7, wherein the identifier storing area can store a predetermined number of identifiers.

9. A content control system comprising:
    a first server that manages contents; and
    a plurality of second servers connected to the first server through a first network,
    wherein the second servers are connected to a plurality of terminals that use the contents through a second network respectively and issues acquisition requests to the first server to acquire the contents, respectively;

wherein the first server has a plurality of memory areas corresponding to each of a plurality of group identifiers, each identifying a group consisting of a plurality of users;

wherein the first server accepts an acquisition request from one of the second servers through the network with respect to a first content to be stored in any of the memory areas;

wherein the first server compares the identifier of a source of the acquisition request with the plurality of group identifiers, if the identifier of the source of the acquisition request matches the group identifier of the one of the plurality of memory areas, permits the delivery of the first content and sends the first content to the source of the acquisition request;

if the identifier of the source of the acquisition request does not match any of the plurality of the group identifiers, whether or not the predefined first content acquisition permission identifier of the source of the first content matches the identifier of the acquisition request source; and sends the first content to the acquisition request source if the predefined acquisition permission identifier of the first content matches the identifier of the source of the acquisition request.

10. The content control system according to claim 9, further comprising:

an information server connected to the first network, wherein the information server includes a table of correspondence between a gateway attribute information and information related to the attribute information; and wherein the system delivers the related information according to the attribute information received from the content control server.

11. A content delivery control method of a content control server connected to a plurality of content using servers so as to control the delivery of contents, the control server having a plurality of memory areas corresponding to each of a plurality of group identifiers composed of a plurality of users, the method comprising:

accepting an acquisition request for a first content using server through a network with respect to a first content to be stored in one of the plurality of the memory areas;

comparing an identifier of a source of the acquisition request with the plurality of the group identifiers;

if both the identifiers match with each other, permitting the delivery of the first content to the acquisition request source;

if the identifier of the source of the acquisition request matches the group identifier of the one of the plurality of memory areas, permits the delivery of the first content and sends the first content to the source of the acquisition request, if the identifier of the source of the acquisition request does not match any of the plurality of the group identifiers, determining whether or not a predefined acquisition permission identifier of the source of the first content matches with the identifier of the source of the acquisition request and sends the first content to the acquisition request source if the predefined acquisition permission identifier of the first content matches the identifier of the source of the acquisition request.

* * * * *